US011979961B2

(12) United States Patent
Zaveruha et al.

(10) Patent No.: US 11,979,961 B2
(45) Date of Patent: May 7, 2024

(54) NETWORKED LIGHTING CONTROL SYSTEM WITH LIGHTING VALUE TRACKING PROTOCOL

(71) Applicants: ABL IP HOLDING LLC, Conyers, GA (US); Ryan A. Zaveruha, Trumbull, CT (US); Richard L Westrick, Jr., Social Circle, GA (US); Maurits van der Hoorn, Conyers, GA (US)

(72) Inventors: Ryan A. Zaveruha, Trumbull, CT (US); Richard L Westrick, Jr., Social Circle, GA (US); Maurits van der Hoorn, Conyers, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 17/864,130

(22) Filed: Jul. 13, 2022

(65) Prior Publication Data
US 2024/0023220 A1 Jan. 18, 2024

(51) Int. Cl.
G06Q 30/02 (2023.01)
G06Q 30/0207 (2023.01)
H05B 47/175 (2020.01)

(52) U.S. Cl.
CPC ....... H05B 47/175 (2020.01); G06Q 30/0215 (2013.01)

(58) Field of Classification Search
CPC .................. H05B 47/175; G06Q 30/0215
See application file for complete search history.

(56) References Cited

U.S. PATENT DOCUMENTS

| 8,610,377 | B2 * | 12/2013 | Chemel | H05B 47/155 315/318 |
| 10,750,584 | B2 * | 8/2020 | Scott | H03K 17/9622 |
| 2010/0301770 | A1 * | 12/2010 | Chemel | H05B 47/155 315/294 |

(Continued)

OTHER PUBLICATIONS

Acuity Controls nLight GreenScreen Software (Year: 2015).*

(Continued)

Primary Examiner — Breffni Baggot
(74) Attorney, Agent, or Firm — Buchanan Ingersoll & Rooney PC

(57) ABSTRACT

A lighting system includes a plurality of lighting system elements. The lighting system elements include a luminaire and a reporting device. The luminaire includes a light source to emit illumination light. The reporting device includes a reporting device network communication interface system for network communication, a reporting device processor, a reporting device memory, and reporting device programming in the reporting device memory. Execution of the reporting device programming causes the respective reporting device to collect a respective performance metric of a respective luminaire and submits a respective claim including the respective performance metric to one or more storage devices. A respective storage device validates a plurality of claims, including the respective claim. The storage device stores the subset or all of the plurality of claims in a block in at least one storage device of the one or more storage devices. The block includes a lighting value token.

28 Claims, 9 Drawing Sheets

(56) References Cited

U.S. PATENT DOCUMENTS

| | | | | |
|---|---|---|---|---|
| 2019/0069375 A1* | 2/2019 | Baker | ............. | H04N 21/43635 |
| 2019/0340306 A1* | 11/2019 | Harrison | ............... | G06T 15/506 |
| 2020/0027005 A1* | 1/2020 | Harrison | .................. | G06N 5/02 |
| 2022/0237575 A1* | 7/2022 | Ueno | .................. | G06Q 20/065 |

OTHER PUBLICATIONS

Acuity Controls nLight Operation, Programming and Maintenance Manual Hardware Manual (Year: 2020).*
Acuity Controls nLight Operation, Programming and Maintenance Manual (Year: 2020).*
Acuity Controls nLight Sensorview Manual (Year: 2015).*
Acuity Controls nLight Sensorview Manual (Year: 2019).*
Acuity Controls, GreenScreen Software, Sensor View Energy Savings Data Logging & Analysis Plug-In, downloaded from the internet at https://nlight.acuitybrands.com/-/media/abl/nlight/files/resources/specification-tools/greenscreen-spec-sheet-pdf.pdf?la=en&hash=C236E9AE8ACE18160C93E6543DE19738&forceBehavior=open , 2015, 3 pages.

* cited by examiner

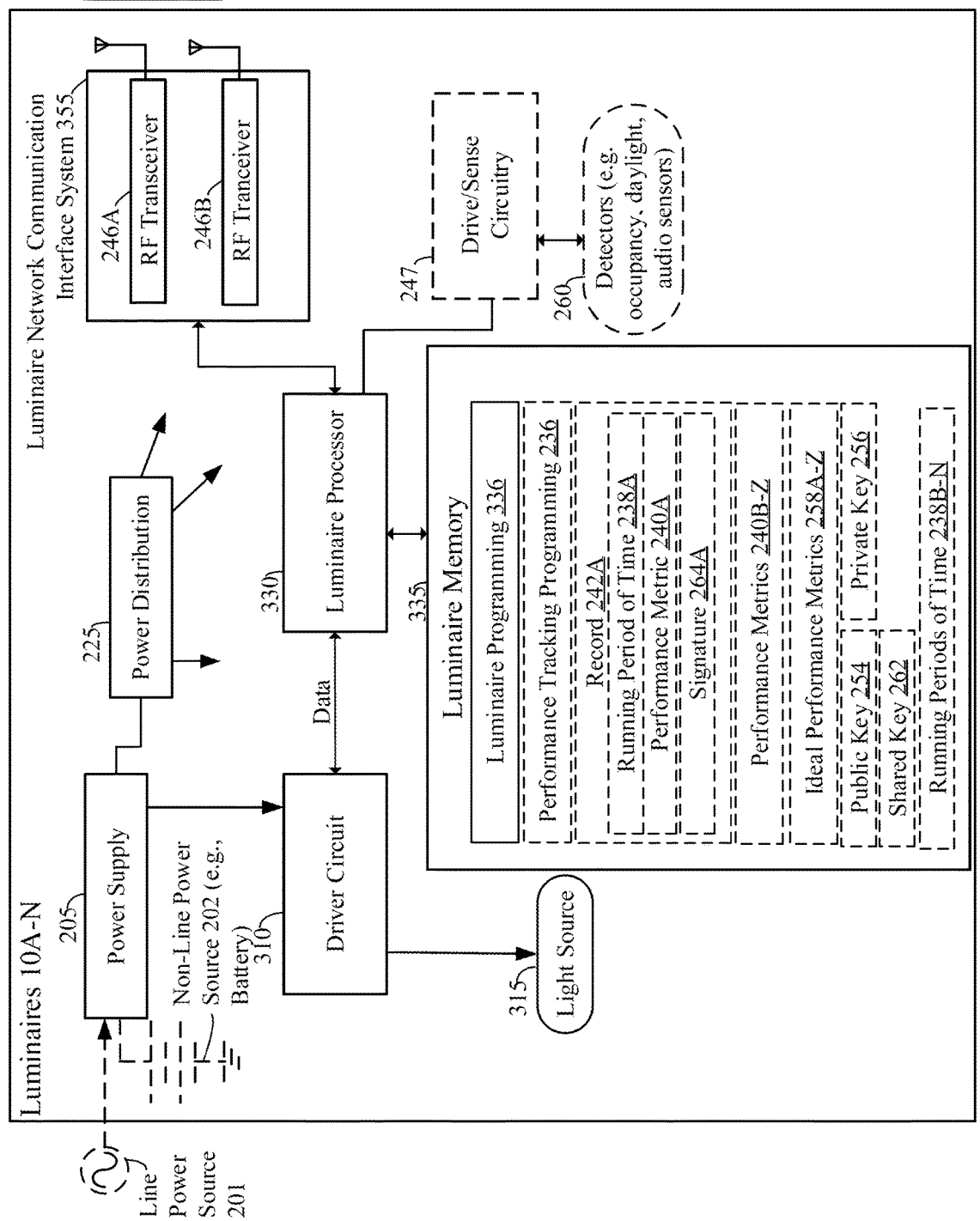

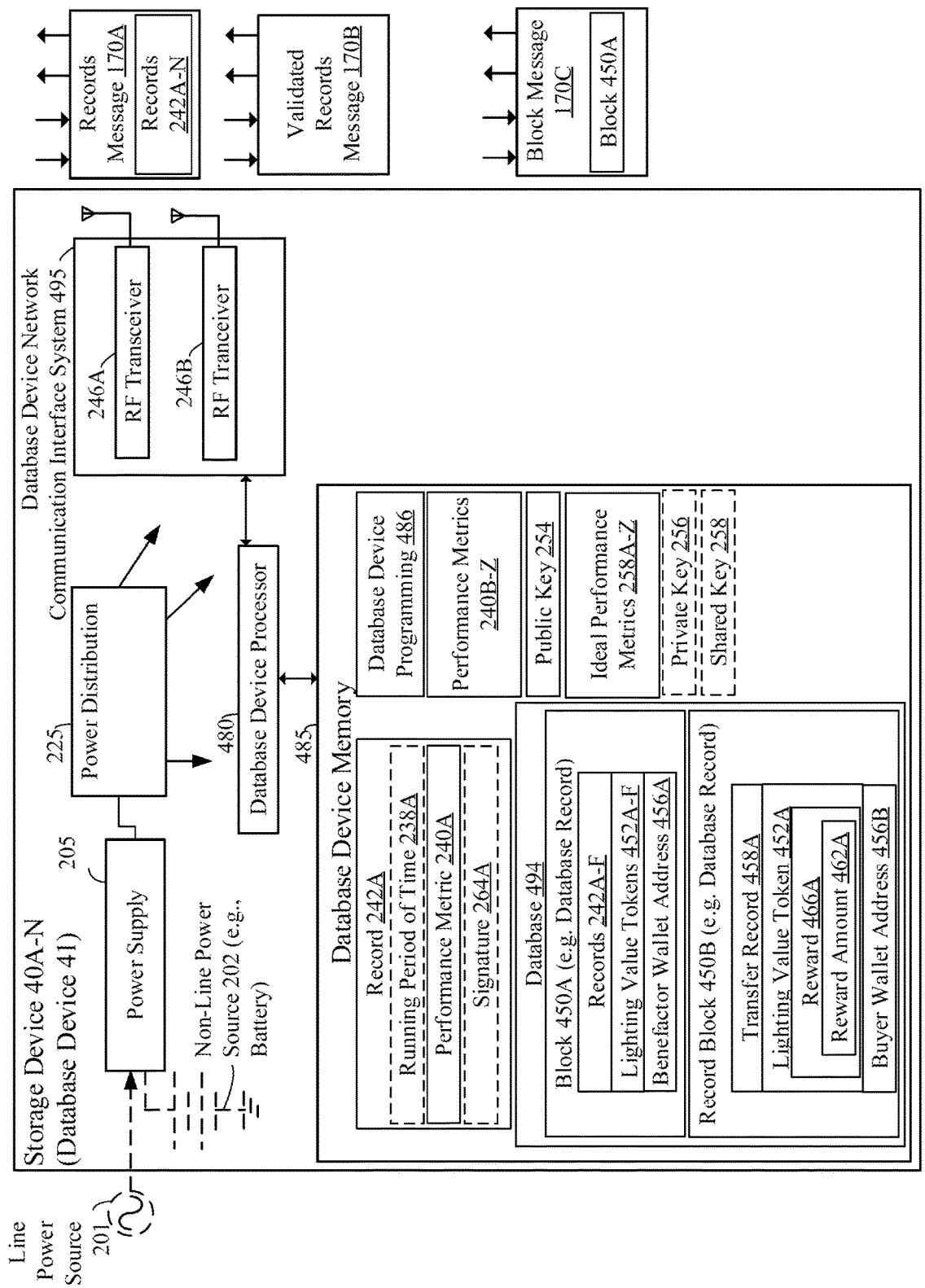

NETWORKED LIGHTING CONTROL SYSTEM WITH LIGHTING VALUE TRACKING PROTOCOL

BACKGROUND

Conventionally, lighting equipment is often designed to maximize light produced per watt, or to maximize light produced over the lifetime of the lighting equipment. This optimization is often built into the light, by designing a light source that lasts a certain number of hours while producing a certain number of lumens. A light source therefore can be designed to balance wattage, luminosity, and lifespan. Alternatively, optimization can be achieved by adjusting the amount of power or wattage provided to the light source. Lowering the wattage provided to a light source implicitly lowers the wattage used by the light source, and can often extend the lifespan of the light source—at the expense of producing fewer lumens.

However, existing wireless lighting control systems do not address a responsive strategy directed to promoting honest reporting of light source compliance with owner or regulatory requirements, and do not address promoting encouraging compliance with light source owner requirements. The owners of lighting equipment have a long felt but unresolved need to have light sources meet performance requirements beyond efficient wattage or efficient lifespan of their light sources. These requirements are often driven by national or regional government regulations or by utility incentive programs which can be very specific and evolving. For example, lighting equipment owners may need to have their light sources operate efficiently not with respect to watts consumed, or light source lifespan, but with respect to available ambient sunlight: lights in sunny areas should need to produce less lumens than lights in shaded or dark areas. Lighting equipment owners may also require or prefer a certain lighting configuration, independent of the actual results of that configuration. A light source set to be energy-efficient by utilizing occupancy sensors may be considered preferable to a light source that is constantly powered—even if the occupancy sensors of the energy-efficient light ultimately cause that light source to be constantly powered due to constant, twenty-four-hour occupation. Both light sources consume the same number of watts, and experience the same wear-and-tear, but the light source with the occupancy sensor may be considered superior by the owner due to being configured to only operate when the space of the light source is occupied.

Some organizational systems currently exist to promote energy efficiency. For example, many building codes include specific efficiency requirements and corporations and governments often issue rebates for devices that are designed to be energy efficient. Electrical companies often have tiered rate plans, rewarding those who use fewer kilowatt hours than the electrical company considers reasonable or efficient. However, these systems are blunt tools attempting to solve a nuanced problem. Equipment that is designed to be energy efficient may not ultimately be used in an energy-efficient manner—even still, the rebate is nevertheless still issued on the equipment. Electrical metering is usually done at a building or business entity level, and is not performed at the level of individual devices: an office worker may judiciously turn off their lights when they leave their office, but not receive a lower-tier electrical bill due to another office worker leaving their air conditioning running constantly. Building-level metering also makes it difficult to incentivize efficient behavior in the proper individuals: the electric bill becomes a tragedy of the commons, and no one behaves conscientiously.

Users of equipment may also be dishonest, and may falsely report the settings selected, light sources used, and ultimately how much wattage was utilized by a light source in order to maximize rebates and minimize electrical bills.

Accordingly, a system for deploying evolving and specific requirements for electrical systems, promoting compliance with those requirements, and enforcing faithful reporting of that compliance is desired to overcome these and other limitations in the art.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a block diagram of a luminaire of the lighting system that communicates via the lighting control network of FIG. 1.

FIG. 4A is a block diagram of a storage device implemented as a database device that is in the lighting system that communicates via the lighting control network of FIG. 1.

DETAILED DESCRIPTION

Figure 1:
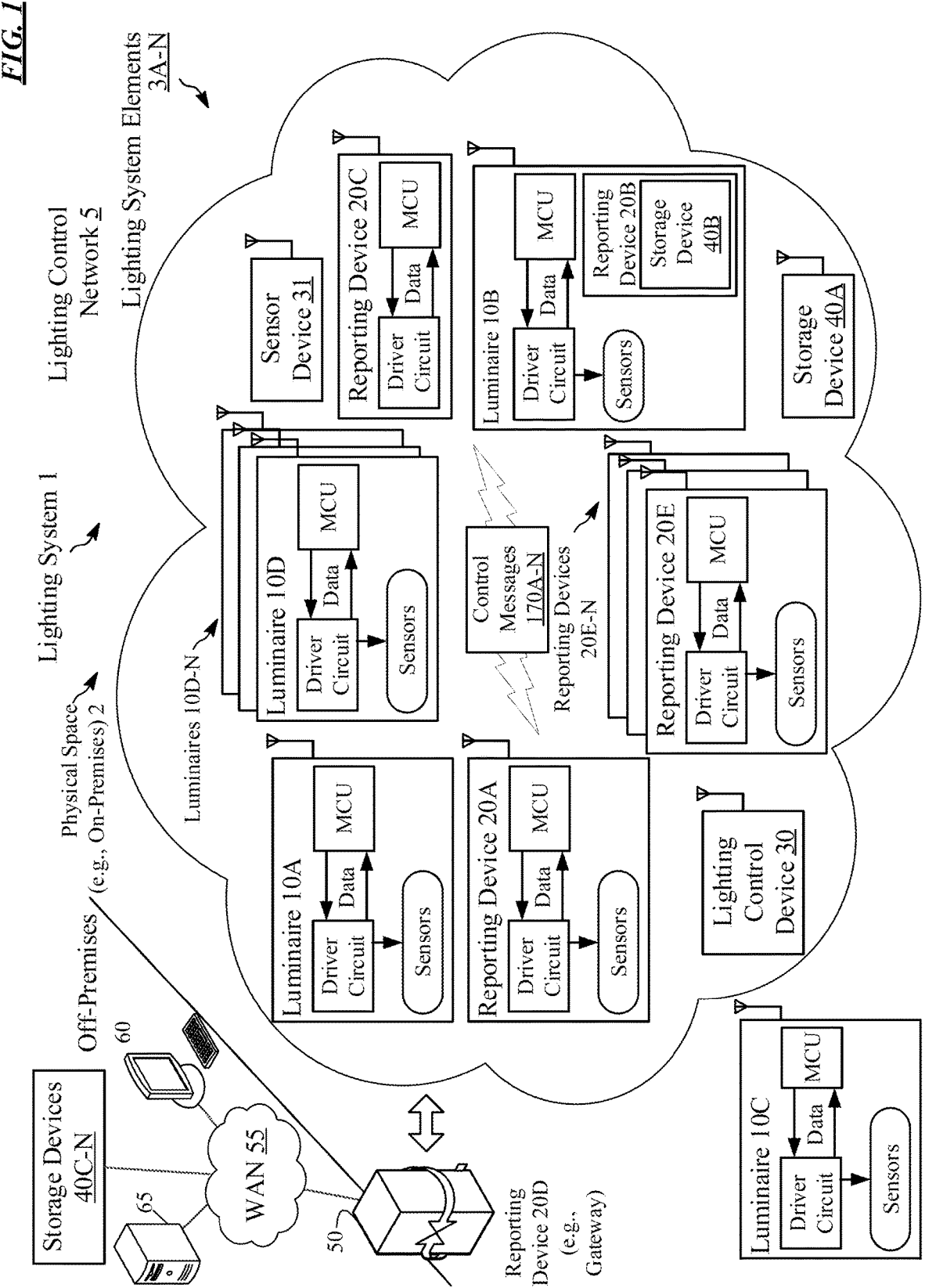
FIG. 1 is a high-level functional block diagram of an example of a lighting system including a plurality of luminaires and reporting devices.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor, sensor(s), or alternative higher-level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting control system" or "lighting system" as used herein, is intended to encompass essentially any type of system that either includes a number of such luminaires coupled together for data communication and/or luminaire(s) coupled together for data communication with one or more control devices, such as wall switches, sensors, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting" or "illumination lighting" as used herein, are intended to encompass essentially any type of lighting in which a luminaire produces light by processing of electrical power to generate the light. A luminaire for artificial lighting or illumination lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light-based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher-level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, RF, physical, or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

Reference now is made in detail to the examples illustrated in the accompanying drawings and discussed below.

FIG. 1 is a high-level functional block diagram of an example of a lighting system 1 that includes a plurality of lighting system elements 3A-N. The plurality of lighting system elements 3A-N includes a plurality of luminaires 10A-N, a plurality of reporting devices 20A-N, and a plurality of storage devices 40A-B. The lighting system 1 in particular includes a reporting device 20D acting as a gateway 50. The lighting system 1 supports an electrical load value tokenization protocol 800 (see FIG. 8) for reporting performance metrics 240A-Z (see FIG. 2) of the luminaires 10A-N, HVAC devices 510A-N (see FIG. 5), or appliances 710A-C (see FIG. 7) by the reporting devices 20A-N, and recording those same performance metrics 240A-N utilizing the storage devices 40A-N. The numbers of elements within the lighting control system 1 are for illustrative purposes only: any number of luminaires 10A-N, reporting devices 20A-N, lighting control device(s) 30, sensor device(s) 31, storage devices 40A-B, gateways 50A-N, and other networked devices can be included in the lighting system 1. The components in off-premises location 60, including a wide-area network (WAN) 55, cloud computing device 65, and storage devices 40C-N may be fully integrated components of lighting system 1 or part of a $3^{rd}$-party system used for validation. Lighting system 1 provides a variety of lighting controls of a lighting control group over lighting control network 5, and may support light commissioning/maintenance network communication over the lighting control network 5. Lighting control communication includes communications in support of turning lights on/off, dimming, set scene, and sensor trip events. Communication between lighting system elements 3A-N can occur in the form of control messages 170A-N.

Storage devices 40A-B reside on the lighting control network, but storage devices 40C-N can reside beyond the gateway reporting device 20D, on a validator network for inter-communication between storage devices 40C-N. Further, the lighting control network 5 can allow the storage devices 40A-N implemented as validator devices 42 to maintain and add to a blockchain 444 (see FIG. 4B) implemented within the lighting control network 5.

Figure 2:
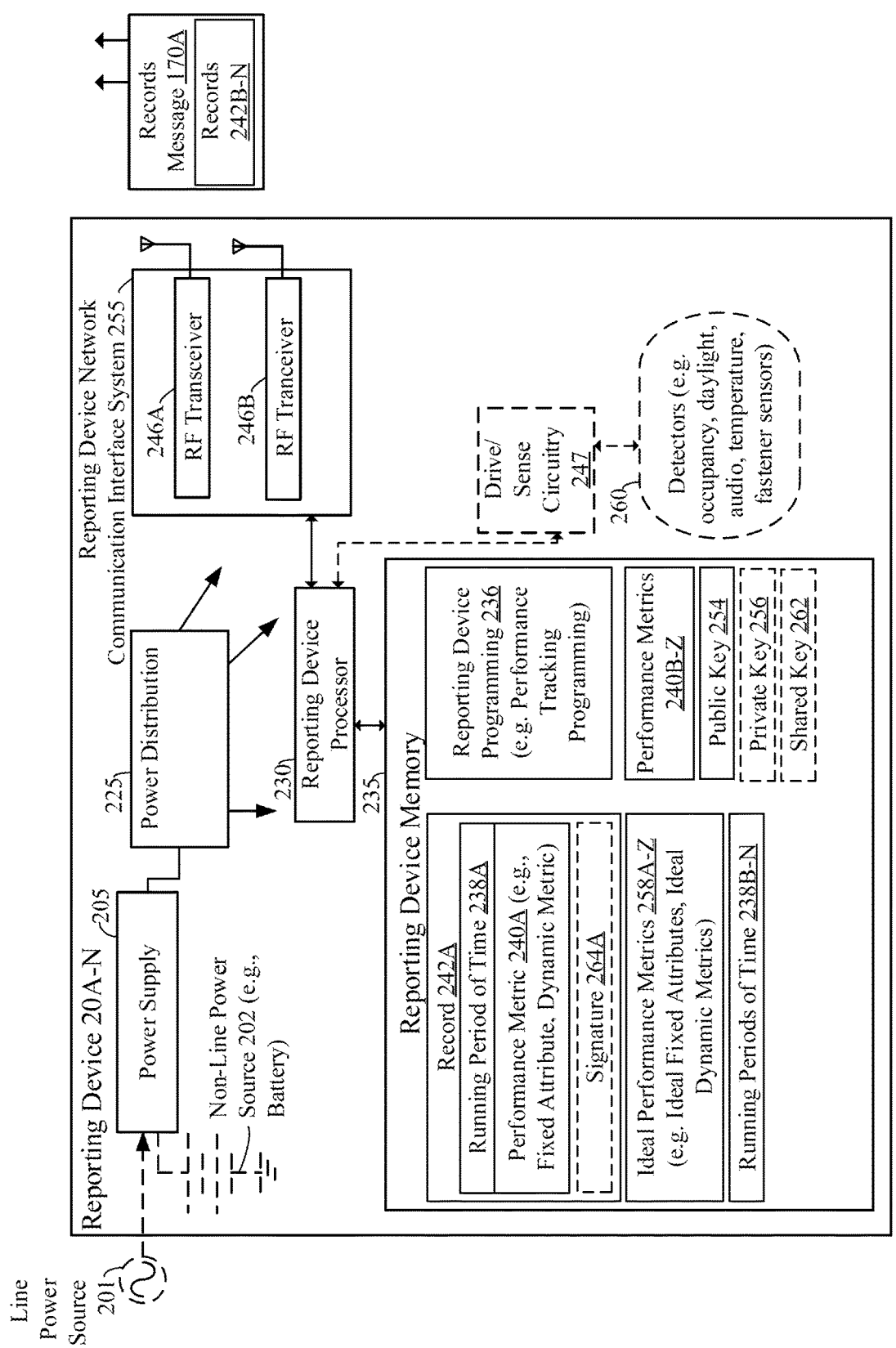
FIG. 2 is a block diagram of a reporting device that is in the lighting system that communicates via the lighting control network of FIG. 1.

Referring now to FIG. 2, the lighting system 1 observes the performance of the luminaires 10A-N during a running period of time 238A, and records the performance of the luminaires 10A-N as performance metrics 240A-Z associated with that running period of time 238A as a record 242A. The pairing of a particular luminaire 10A, a particular running period of time 238A, and a particular performance metric 240A is unique: duplicate records 242A for the same luminaire 10A, running period of time 238A, and performance metric 240A should be prohibited or ignored to avoid incorrect recordation. To assist in avoiding incorrect recordation, records 242A can be signed with a signature 264A, the signature 264A utilizing a public key 254, a private key 256, and/or a shared key 262.

The performance metrics 240A-Z are quantifiable representations of the performance of the luminaires 10A-N, which can be weighed and compared. In some examples, the performance metrics 240A-Z are normalized, such that a comparison between one performance metric 240A and another performance metric 240B can be validly performed—even if the two compared performance metrics 240A-B quantify different behavior. For example, a first performance metric 240A measuring electricity usage of a first luminaire 10A, and a second performance metric 240B measuring lighting produced by a second luminaire 10B—by normalizing the two performance metrics 240A-B, one can determine which luminaire 10A-B provided superior performance, even though both luminaires 10A-B were judged on different criteria. In systems like the electrical load system 701 of FIG. 7, normalization of performance metrics 240A-Z allows for comparison of performance between different types of electrical load system elements 703A-N, e.g. between a luminaire 10E and an HVAC device 510D, or between a luminaire 10F and an appliance 710A. Performance metrics 240A-Z can be further divided into fixed attributes and dynamic metrics. Generally, fixed attributes are performance metrics 240A-Z which do not vary during operation of a luminaire 10A; some examples of fixed attributes include an active image firmware designation, physical attributes of the luminaire 10A, and default configurations. Alternatively, dynamic metrics are performance metrics 240A-Z which do vary during operation of the luminaire 10A; some examples of dynamic metrics include the physical state of emitted lighting, the state of a lighting control algorithm, or modifications made to the default configurations. The distinction between fixed attributes and dynamic metrics can be arbitrary, and in some examples a performance metric 240A may be identified as a fixed attribute, while in another example that same performance metric 240A may be identified as a dynamic metric.

Figure 4B:
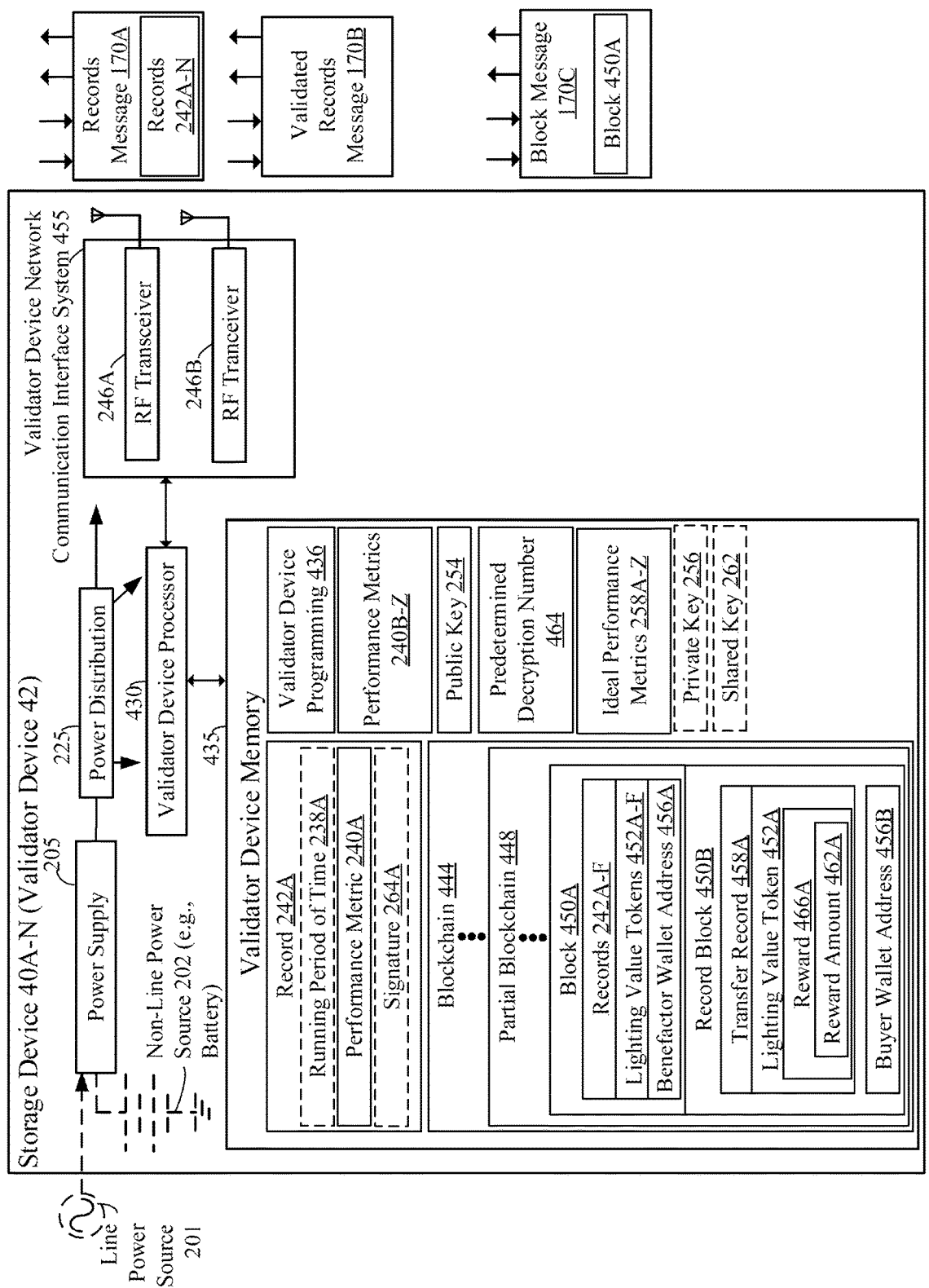
FIG. 4B is a block diagram of a storage device implemented as a validator device that is in the lighting system that communicates via the lighting control network of FIG. 1.

As further detailed in FIGS. 4A-B, the luminaires 10A-N, reporting devices 20A-N, and storage devices 40A-N can store ideal performance metrics 258A-Z in memory 235, 335, 435, 485. Ideal performance metrics 258A-Z can be compared to performance metrics 240A-Z to determine how well or poorly a luminaire 10A performed in satisfying the performance goals of the owner of the luminaire 10A. As the ideal performance metrics 258A-Z can be set at a reporting device 20A or luminaire 10A level, in some implementations the ideal performance metrics 258A-Z are stored in the reporting device 20A or luminaire 10A, and sent along with the related performance metrics 240A-Z to the storage devices 40A-N for storage. In other implementations, the storage devices 40A-N store the ideal performance metrics 258A-Z, and the reporting device 20A is not required or permitted to store the ideal performance metrics 258A-Z. Maintaining the ideal performance metrics 258A-Z can allow the owner of the lighting control network 5 to enforce governance rules more effectively, as the performance can be weighed and rated at the storage devices 40A-N: in some examples, the owner of the lighting control network 5 may have physical possession and physical control over the storage devices 40A-N, but not over the reporting devices 20A-N or luminaires 10A-N: by weighing and rating performance at the storage devices 40A-N in the physical possession and control of the owner of the lighting control network 5, errors and fraud can often be more easily detected, and corrected or ignored.

Referring now to FIG. 4A, the lighting system 1 can maintain a database 494A within one or more storage devices 40A-N configured as database devices 41 for the secure storage of performance metrics 240A-Z of the luminaires 10A-N, the accurate tokenization of those performance metrics 240A-Z, and the transaction of the tokenized performance metrics 240A-Z. The database 494 can be a traditional database, accessed by a database management system (DBMS) implementing atomicity, consistency, isolation, and durability to store blocks 450A-B or database records. The database 494 can reside in a single storage device 40A, or can be shared across a cluster of storage devices 40A-N. The database blocks 450A-B can track records 242A-F, 458A; lighting value tokens 452A-F, and wallet addresses 456A-B in the database 494 associated with lighting value tokens 452A-F.

The database device memory 485 can include: a whitelist of public keys 254 or shared keys 258 associated with validated luminaires 10A-N and reporting devices 20A-N with a controlled chain of custody; a blacklist of public keys 254 or shared keys 258 that have been deemed invalid to ensure they are never added to the whitelist; a history of all validated records 242A containing the public key 254 or shared key 258 of each respective luminaire 10A-N, and the running period of time 238A recorded. The database device programming 486 can also include a service to validate records 254, and can verify record signatures 264A based on whitelist of public keys 254 or shared keys 258, verify the running period of time 238A recorded for the device has not already been allocated in the history, and verify the running period of time 238A does not start before the known creation of the luminaire 10A, or that the running period of time 238A does not occur in the future. Records 242A may be made based on a running period of time 238A when exact timekeeping is difficult. The sum of running periods of time 238A-N in records 242A-N for a given luminaire 10A should not exceed the time available in the window of time for those records 242A-N. For example, no more than 24 hours of a running period of time 238A should assigned to a given day in a record 242A (except when the clocks change).

The database device programming 486 can also include a service to convert validated records 242A, and validated records 242A can be converted based on the needs of the organization or owner. For example, records 242A may be treated like a traditional rebate application: the amount of the rebate would be determined by the conversion rules published and implemented by the organization or owner. Rebates may be fulfilled through traditional means such as a paper check being issued to the individual or company specified as the claimant or user. The organization or owner may implement various auditing procedures to ensure the validity of records 242A, associated luminaires 10A-N, reporting devices 20A-N, storage devices 40A-N, manufacturers, or claimants.

Referring now to FIG. 4B, the lighting system 1 can alternatively or additionally maintains a blockchain 444 within the validator devices 42 for the secure storage of performance metrics 240A-Z of the luminaires 10A-N, the accurate tokenization of those performance metrics 240A-Z, and the transaction of the tokenized performance metrics 240A-Z. The blockchain 444 in this example is a ledger, distributed among the validator devices 42, maintaining transactions which create light value tokens 452A and transfer those light value tokens 452A between traders. The reporting devices 20A-N fill the role somewhat analogous to miners in a conventional blockchain. However, conventional blockchains often operate on a proof-of-work model, where miners create value by solving increasingly complicated math problems. In this example, the lighting system 1 operates on a proof of lighting value model, e.g., a proof of performance value model, where reporting devices 20A-N create value by determining how effectively the luminaires 10A-N of the lighting system 1 follow their performance metrics 240A-Z In FIGS. 4A-B, users or operators of the luminaires 10A-N earn lighting value tokens 452A by controlling their luminaires 10A-N in such a manner that the luminaires 10A-N produce high quality performance metrics 240A-Z. The reporting devices 20A-N, often under the control of the owner of the lighting system 1, record this behavior. Then, the reporting devices 20A-N bundle the performance metrics 240A-Z into records 242A-N, and transmit the records 242A-N to the storage devices 40A-N. The storage devices 40A-N cryptographically validate the records 242A-N, store the records 242A-N, and allocate lighting value tokens 452A to the digital wallet addresses 456A-B of the users or operators. Validating the records 242A-N can include verifying that a single record 242A is being validated for a specific running period of time 238A and luminaire 10A pairing. Some luminaires 10A-N may not have a clock implemented, but may have a timer. In such examples, the storage devices 40A-N ultimately ensure that records 242A-N are not double counted.

Double counting can occur if a luminaire 10A or reporting device 20A submits a performance metric 240A which overlaps with another performance metric 240B for the same running period of time 238A. In one example, this would occur if the luminaire 10A submits a performance metric 240A which covers a 25-hour span of time every 24-hour period: those submitted performance metrics 240A overcount an hour of performance every 24 hours. Requiring a running period of time 238A to be specified allows basic limits to be enforced: such as a luminaire 10A not being able to claim more than 100% of the available time within a given period (no more than 365 days claimed in a year.) In this example, the storage devices 40A-N ensure that performance metrics 240A are only submitted for a running period of time 238A equal to the span of time covered, to prevent double counting. This type of double counting can be further prevented if the reporting device 20A-N (which can implement a clock) appends the relevant time (the current time, the time the time span started, and/or the time the time span concluded) to the performance metric 240A as part of the running period of time 238A when preparing the bundling record 242A to send to the storage devices 40A-N. In some example, only a single record 242A may be applied to a luminaire 10A for any given running period of time 238A.

Records 242A-N can be segmented into blocks of time. Some performance metrics 240A-N may be reported with percentage compliance within the time of a given record 242A. For example, a 30% occupancy enabled during a 120-minute record 242A running period of time 238A. The exact time for a given record 242A is not particularly important, but rather the avoidance of records 242A involving the same luminaire 10A during the same running period of time 238A.

In another example of potential double counting, a luminaire 10A transmits a performance metric 240A to a first reporting device 20A, and then transmits that same performance metric 240A to a second reporting device 20B. Both reporting devices 20A-B transmit the same performance metric 240A to the storage devices 40A-N. The storage devices 40A-N can discern that the same performance metric 240A, representing the performance of a given luminaire 10A for a given running period of time 238A in a given performance metric 240A, was submitted twice, and can reject one of the two submissions. Alternatively, the storage devices 40A-N can request that the reporting devices 20A-B and the luminaire 10A re-convene and determine which performance metric 240A should be validated and stored by the storage devices 40A-N.

After validation, at a later time, the users or operators can transact with other users, operators, owners, or third parties (such as rebate sponsor, building owners, environmental compliance auditors, or governments) for any earned lighting value tokens 452A. Such transactions are also recorded in the database 494 or on the blockchain 444, although examples where separate blockchains and databases exist for recording performance metrics and transferring lighting value tokens 452A are considered: such examples may be implemented if the quantity of transactions, timing of transactions, or cost of transacting are materially different between the recordation of performance transactions, and the transference transactions.

The depicted example utilizes a blockchain 444, but any form of ledger or database 494 can be utilized, whether centralized or decentralized. If a centralized ledger is used, such as a database device 41, a single storage device 40A may be used rather than a plurality of storage devices 40A-N. In such an example the storage device 40A reaches a consensus of one, i.e., with itself, and stores the records 242A-F in the database 494 or ledger. If a blockchain is used, the blockchain 444 can be a blockchain specifically implemented to store light value tokens 452A-F, or it can be an existing blockchain, preferably one which allows for smart contract transactions within the blockchain ledger. Later figures disclose an HVAC value token 552A (see FIG. 5) and an electrical load value token 752A (see FIG. 7). The HVAC value token 552A or electrical load value token 752A can be stored in separate blockchains which do not share consensus with the blockchain 444 storing the lighting value token 452A; or, the HVAC value token 552A or electrical load value token 752A can be stored in a database 494. Alternatively, any or all of the described tokens (lighting value token 452A, HVAC value token 552A, or electrical load value token 752A) can be stored in the same blockchain 444 or database 494. In such an example, the structure of the lighting value token 452A, HVAC value token 552A, and electrical load value token 752A may vary, or the structure can be the same, and any distinction between the lighting value token 452A, HVAC value token 552A, and electrical load value token 752A is in name and not in function.

Returning to FIG. 1, the lighting system 1 can further include a sensor device 31, or multiple sensor device(s) 31 which can monitor any physical or occupant condition or phenomenon in the space (e.g., occupancy, motion, ozone, daylight, audio, temperature, or fastener detector(s) 260) on behalf of any of the luminaires 10A-N, reporting devices 20A-N, or other lighting system elements. Sensor device(s) 31 can monitor luminaire 10A-N performance and/or conditions in the space, without being directly integrated into either a luminaire 10A-N or a reporting device 20A-N. Instead, the sensor device 31 can report the performance of a luminaire 10A-N and/or conditions in the space to a reporting device 20A-N, and the reporting device can use that in determining performance metrics 240A-N.

A lighting control device 30 or multiple lighting control devices 30 may also be present, and can include user interface elements to allow an operator or user to configure the lighting system 1 and lighting system elements 3A-N and ultimately energize the luminaires 10A-N in order to emit illumination lighting. A lighting control device 30 may also provide information to the reporting devices 20A-N, for example that a user attempted to powered off a luminaire 10A, even if the luminaire programming (see FIG. 3) would not allow the luminaire 10A to be powered off at that time: as performance metrics 240A-N can track users' good faith efforts to efficiently use the lighting system elements 3A-N, good-faith but ineffective use a lighting control device 30 to increase the performance of the lighting control network 5 may be behavior the owner of the lighting system elements 3A-N would like to record and potentially reward. Good-faith attempts by the occupants to control their lights manually, whether effective or not, may also be used to manually or automatically (i.e., through artificial intelligence or machine learning techniques) optimize the lighting system programming.

Figure 5:
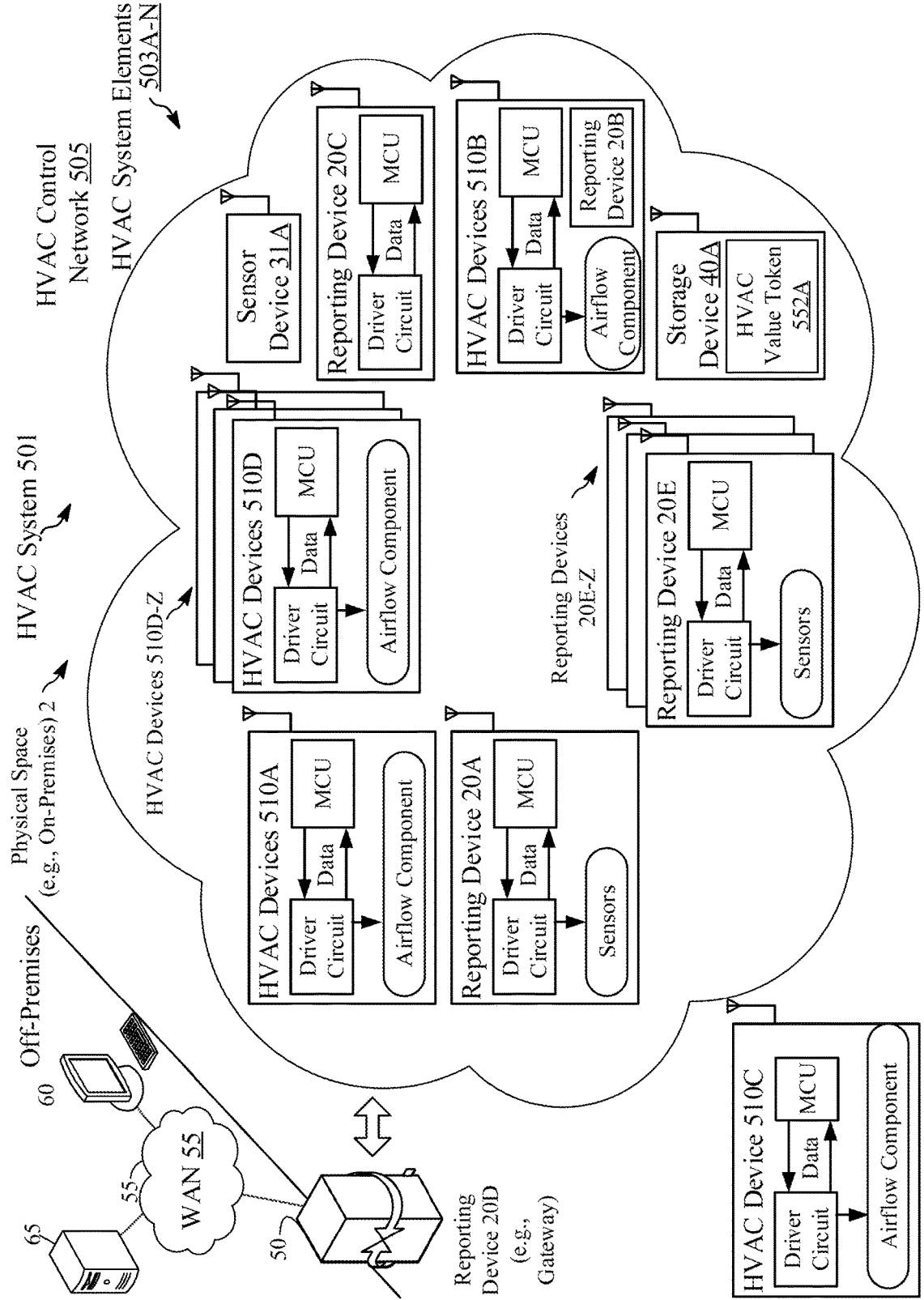
FIG. 5 is a high-level functional block diagram of an example of a heating, venting, and air cooling (HVAC) system including a plurality of HVAC devices and reporting devices, similar to the lighting system of FIG. 1.
Figure 7:
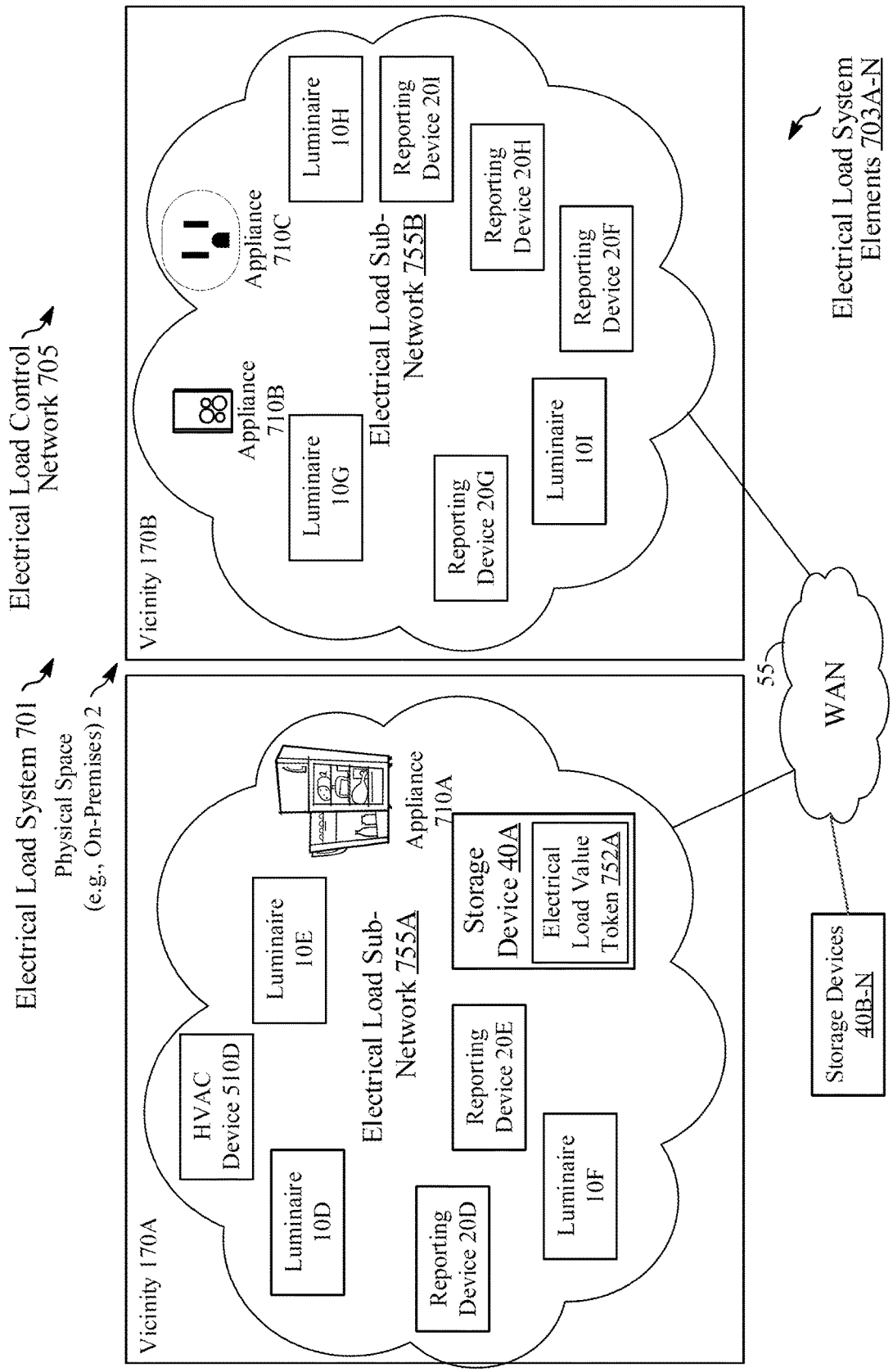
FIG. 7 is a high-level functional block diagram of an example of an electrical load system including a plurality of luminaires, HVAC devices, appliances, reporting devices, and validators divided between two vicinities or connected to a wide-area network (WAN), and able to communicate via the WAN.

Each of the lighting system elements 3A-N is physically connected to the lighting control network 5, which can be a wired network via communication wires or cables (ex: CAT5 cable) or enabled for wireless network communication (ex: BLUETOOTH® Low Energy (BLE), Wi-Fi, near field communication (NFC), optical communication, Sub-GHz RF communication, etc.). Therefore, the lighting system 1 may comprise of all wired connected control devices, wireless only connected devices, or hybrid combination of both wired and wireless control devices. Sensor device(s) 31 or sensors 260 (see FIG. 2) can include a traditional passive infrared motion sensor (PIR) enhanced with microphonics, or an audio detector circuit, for improved reliability of motion and occupancy sensing. In other embodiments, the motion sensors of sensor device(s) 31 or the sensors 260 may be based on ultrasonic, UWB, radar, or other motion sensing technologies. In a similar manner, each of the HVAC system elements 503A-N of FIG. 5 are physically connected to the HVAC control network 505, and each of the electrical load system elements 703A-N of FIG. 7 are physically connected to the electrical load control network 705—even if that connected is solely through a metered electrical socket, like the appliance 710C of FIG. 7.

As shown, each of the reporting devices 20A-N include an on-board reporting device processor 230, which is shown in more detail in FIG. 2. The reporting device processor 230 is connected to a reporting device memory 235 (volatile and non-volatile). As shown, the reporting device processor 230 is coupled to drive/sense circuitry 247 operable to control detectors 260. The luminaire devices 10A-N have a luminaire driver circuit 310 that controls light source operation of a light source 315.

Reporting devices 20A-N, storage devices 40A-B, and luminaires 10A-B, D-N can communicate control signal(s) 170A-N for the luminaire light source(s) 315 over a wireless lighting control network 5 (e.g., 900 MHz) and accordingly can each include an RF transceiver 246A in the sub-GHz range. A variety of control signals 170A-N for the luminaire light source(s) 315 are transmitted over wireless lighting control network 5, including, for example, to turn the luminaire light source 315 on/off and sensor trip events. Messages 170A-B related to records 242A-N (see FIG. 2) may be sent from reporting devices 20A-N to record performance metrics 240A-Z, and can be sent between storage devices 40A-N to maintain the blockchain 444 or database 494. These claims control messages 170A-B may be forwarded between storage devices 40A-N by other lighting system elements 3A-N, such as the luminaires 10A-B, D, N.

Alternatively, the lighting control network 5 may be partially or completely wired, and the reporting devices 20A-N, storage devices 40A-N, and the luminaires 20A-B, D-N communicate over wired data connections. Furthermore, some control signals 170A-N can be communicated over energy-providing wired connections, for example in the presence or absence of voltage or current, or in the timing of the presence or absence of voltage or current.

The lighting control system 1 can be provisioned with set dynamic metrics, fixed attributes, ideal dynamic metrics, and ideal fixed attributes. The fixed attributes, ideal dynamic metrics, and ideal fixed attributes can be factory-programmed, or can be presented in a user-programmable configuration so that the lighting system 1, via a control station or other interface device, behavior can be optimized for the specific physical space 2 and owner or user requirements of the lighting system 1.

The lighting control system 1 can further include a gateway 50. The gateway 50 is a computing device that provides access between a WAN 55 and a local communication network, such as the lighting control network 5. The WAN 55 (e.g., Internet) can be a cellular network, optical fiber, cable network, or satellite network that can be connected to via Ethernet, for example. The gateway 50 may provide routing, access, and other services for the reporting devices 20A-N and the luminaires 10A-B, D-N residing at the physical space 2, for example. In implementations where the luminaires 10A-N and reporting devices 20A-N are not aware of the time or their physical space 2, the gateway 50 can append that information to claims messages 170A. The gateway 50 can be a reporting device 20D.

The lighting control system 1 can still further include a cloud computing device 65, and the cloud computing device 65 resides off-premises 60 (e.g., cloud) meaning the cloud computing device 65 is a remote computing device or server hosted on the Internet to store, manage, and process data, rather than the local gateway 50. The gateway 50, cloud computing device 65, or mobile device can also be used to monitor and control (e.g., switch on/off) the luminaire light source(s) 315 of the luminaires 10A-N and other components of the lighting system 1, such as reporting devices 20A-N and storage devices 40A-N. Gateway 50, cloud computing device 65, or a mobile device can receive and process data from the luminaires 10A-N and the reporting devices 20A-N. In particular, gateway 50, cloud computing device 65, or a mobile device can maintain the database 494, or copies of the database 494. Gateway 50, cloud computing device 65, or a mobile device can also maintain the blockchain 444 if utilized, act as or integrate validator devices 42, and assist in validating claims and achieving consensus, in particular for transfer claims 201-202A (see FIG. 4).

The instructions, programming, or application(s) implementing the performance tracking programming 236, reporting device programming 236, database device programming 486, or validator device programming 436 described herein may be software or firmware used to implement any other device functions associated with luminaires 10A-N, reporting devices 20A-N, storage devices 40A-N, network controller (e.g., gateway 50), and cloud computing device Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 235, 335, 435, 485, 635 and/or another computer used to download or otherwise install such programming into the with luminaires 10A-N, reporting devices 20A-N, storage devices 40A-N, network controller (e.g., gateway 50), cloud computing device 65, or a transportable storage device or a communications medium for carrying program for installation in the luminaires 10A-N, reporting devices 20A-N, storage devices 40A-N, network controller (e.g., gateway 50), and/or cloud computing device 65.

Returning to FIG. 2, shown is a block diagram of a reporting device 20A of the lighting system 1. As shown, the reporting device 20A includes a power supply 205 that is driven by a line power source 201 or optionally a non-line power source 202. The power supply 205 may include a magnetic transformer, electronic transformer, switching converter, rectifier, or any other similar type of circuit to convert an input power signal into a power signal suitable for operation of the reporting device 20A. Reporting device 20A includes power distribution circuitry 225 driven by the line power source 201 or non-line power source 202. The power distribution circuitry 225 distributes power and ground voltages to the reporting device processor 230; reporting device memory 235; reporting device network communication interface system 255 (e.g., wireless transceivers, wired interface); and optional on-board occupancy, motion, ozone, daylight, or audio sensor as detectors 260 to reliably record and report operation of luminaires 10A-N. The optional detectors 260 function similarly to a sensor device 31, and a sensor device 31 can be integrated as part of the reporting device 20A and utilize the physical components of the reporting device 20A. In this example, the detectors 260 detect occupancy, daylight, audio, temperature, and fastener status (e.g., whether a window or door in the physical space 2 is open or closed). A reporting device 20A-N monitoring a luminaire 10A may only need to implement some of these detectors 260, whereas a reporting device 260 monitoring an HVAC device 510A or appliance 710A may implement other of these detectors 260. Reporting devices 20A-N may be manufactured with a plethora of, or all reasonable detectors 260, if it is not known at the time of manufacture what type of luminaire 10A-N, HVAC device 510A-N, or appliance 710A-C (see FIG. 7) the reporting device 20A will be monitoring. Reporting device processor 230 includes a central processing unit (CPU) that controls the operation of the reporting device 20A. Reporting device memory 235 can include volatile and/or non-volatile storage.

As shown, reporting device processor 230 is coupled to a reporting device communication interface system 255 for receiving and transmitting various control signals 170A-N. Reporting device communication interface system 255 of FIG. 2, luminaire communication interface system 355 of FIG. 3, database device communication interface 495 of FIG. 4A, validator device communication interface 455 of FIG. 4B, and HVAC device communication interface system 655 of FIG. 6 allow for data communication (e.g., wired or wireless) over various networks, including the lighting control network 5 of FIG. 1, HVAC control network 505 of FIG. 5, or electrical load control network 705 of FIG. 7. Communication interface systems 255, 355, 455, 495, 655 include at least one radio frequency (RF) transceiver 246A (XCVR), for example, a single-band, dual-band, or tri-band chipset of RF transceiver(s) 246A-B configured for wireless communication via separate radios that operate at three different frequencies, such as sub-GHz (e.g., 900 MHz), Bluetooth Low Energy (BLE) (2.4 GHz), and 5 GHz, for example. Communication interface systems 255, 355, 455, 495, 655 can include a first RF transceiver 246A configured for wireless communication (e.g., unicast and multicast) via a wireless lighting control network 5 over a first wireless lighting control network communication band (e.g., sub-GHz) for lighting control and systems operations (or information), such as control signals 170A-N, with lighting system elements 3A-N. Communication interface systems 255, 355, 455, 495, 655 can include a second wireless RF transceiver 246B for communication (e.g., point-to-point) via a commissioning network (not shown) with lighting system elements 3A-N (e.g., mobile device) over a second different wireless commissioning network communication band, such as 1 GHz or above communications (e.g., 2.4 GHz for Bluetooth) for commissioning, configuration, or maintenance operations.

In some examples, the lighting system 1 can further include an optional secondary network (e.g., wired or wireless LAN) for communications involving the electrical load value tokenization protocol 800 (e.g., see FIG. 8) described herein. The optional secondary network may be separate and distinct from the lighting control network 5 and carries light value token communications. Reporting device 20A can communicate over the optional secondary network (via the second wireless RF transceiver 246B, such as a backhaul network for communication between the luminaires 10A-N, reporting devices 20A-N, storage devices 40A-N, and a network controller (e.g., gateway) 50. Transport layer methods ride on the network layer function of the RF transceivers 246A-B. The second RF transceiver 246B is optional. Communication interface systems 255, 355, 455, 495, 655 can include an optional wired network communication interface for communication over a wired lighting control network 5.

Figure 6:
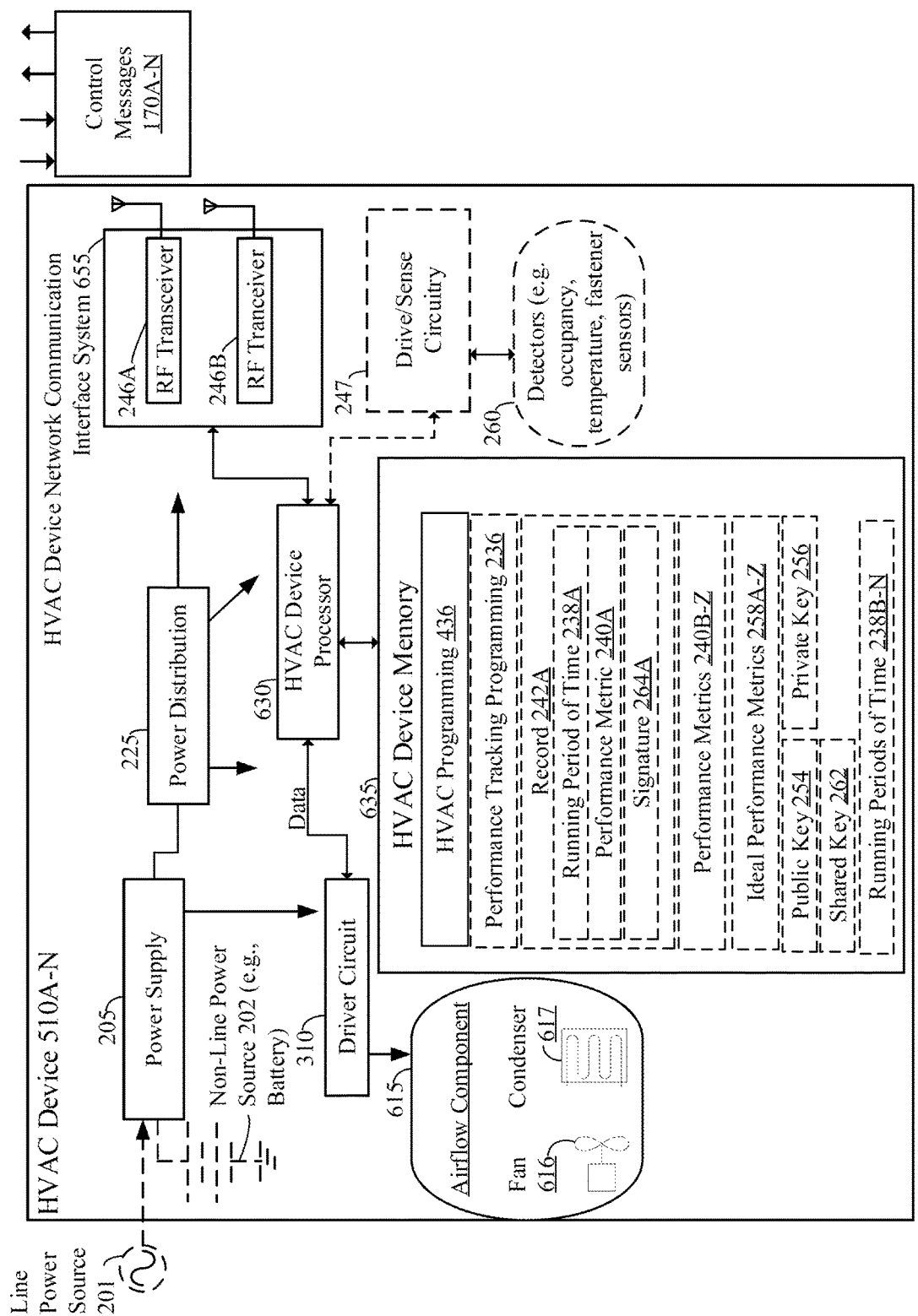
FIG. 6 is a block diagram of an HVAC device of the HVAC system that communicates via the HVAC control network of FIG. 4.

Reporting device processor 230, luminaire processor 330 of FIG. 3, database device processor 480 of FIG. 4, validator device processor 430 of FIG. 4B, and HVAC device processor 630 of FIG. 6 serve to perform various operations, for example, in accordance with instructions or programming executable by processors 230, 330, 430, 480, 630. For example, such operations may include operations related to communications with various lighting control system 1 elements, such as luminaires 10A-N, reporting devices 20A-N, and storage devices 40A-N to implement the electrical load value tokenization protocol 800. Although a processor 230, 330, 430, 480, 630 may be configured by use of hardwired logic, typical processors are general processing circuits configured by execution of programming. Processors 230, 330, 430, 480, 630 include elements structured and arranged to perform one or more processing functions, typically various data processing functions. Although discrete logic components could be used, the examples utilize components forming a programmable CPU. A processor 230, 330, 430, 480, 630 for example includes one or more integrated circuit (IC) chips incorporating the electronic elements to perform the functions of the CPU. The processors 230, 330, 430, 480, 630 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in. Although the illustrated examples of the processors 230, 330, 430, 480, 630 include only one microprocessor, for convenience, a multi-processor architecture can also be used. A digital signal processor (DSP) or field-programmable gate array (FPGA) could be suitable replacements for the processors 230, 330, 430, 480, 630 but may consume more power with added complexity.

Reporting device memory 235, luminaire memory 335 of FIG. 3, database device memory 485, validator device memory 435, and HVAC device memory 635 of FIG. 6 are for storing data and programming. In the example, the main memory systems 235, 335, 435, 485, 635 may include a flash memory (non-volatile or persistent storage) and/or a random-access memory (RAM) (volatile storage). The RAM serves as short term storage for instructions and data being handled by the processors 230, 330, 430, 480, 630 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

FIG. 3 is a block diagram of a luminaire 10A of the lighting control system 1. As shown, the luminaire 10A includes a luminaire light source 315 to emit illumination lighting, to improve visibility for occupants of the physical space 2. The luminaire 10A may have additional luminaire light sources, which can be operated independently from each other: For example, the luminaire light source 315 can be one while the additional luminaire light source is off, or the luminaire light source 315 can be set to 50% intensity while the additional luminaire light source 315 is set to 100% intensity.

As shown, MCU 329 includes power switch processor 330 and power switch memory 331 to implement luminaire programming 336 described herein. The circuitry, hardware, and software of the luminaire 10A is similar to the reporting device 20A of FIG. 2, including the line power source 201, non-line power source 202, power supply 205, power distribution 225, and the optional luminaire processor 330, luminaire memory 335, and luminaire communication interface system 355.

The luminaire light source 315 is configured to emit illumination lighting in the physical space 2. The physical space 2 can include an office, hospital, medical facility, classroom, restaurant, retail store, restroom, and other private or public facilities. However, the light source 315 may also emit non-visible light, such as ultraviolet light.

The luminaire 10A includes a driver circuit 310 coupled to control the light source 315. The driver circuit 310 can drive the light source 315 by regulating the power to the light source 315 by providing a constant quantity or power to the light source(s) 315 as their electrical properties change with temperature as detected by the detectors 260, for example. The driver circuit 310 can include an electrical circuit that pulses a high voltage to ignite or strike an arc of the luminaire light source 315, after which the discharge of the luminaire light source(s) 315 can be maintained at a lower voltage.

Luminaire driver circuit 310 can further include an AC or DC current source or voltage source, a regulator, an amplifier (such as a linear amplifier or switching amplifier), a buck, boost, or buck/boost converter, or any other similar type of circuit or component. Luminaire driver circuit 310 may output a variable voltage or current to the luminaire 10C that may include a DC offset, such that its average value is nonzero, and/or an AC voltage.

The driver circuit 310 of the luminaire 10A is coupled to control the luminaire light source 315. The luminaire driver circuit 310 can include an electrical circuit that pulses a high voltage to ignite or strike an arc of the luminaire light source 315, after which the discharge of the luminaire light source 315 can be maintained at a lower voltage.

The luminaire light source 315 may include electrical-to-optical transducers, such as various light emitters. The emitted illumination lighting may be in the visible spectrum, or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, nanoscale LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. A luminaire 10A that includes a laser diode as luminaire light source 315 can include a light frequency up-converter.

A lamp or "light bulb" is an example of a single light source. An LED light engine may use a single output for a single source but typically combines light from multiple LED type emitters within the single light engine. The luminaire light source 315 can include light emitting diodes (LEDs) that emit red, green, and blue (RGB) light or tunable white light to emit the illumination lighting. Many types of light sources provide uniform light output, although there may be some intensity striations. For purposes of the present examples, however, the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture. The individual emitters or groups of emitters may be separately controllable, for example to control intensity of the source output.

Luminaire driver circuit 310 can drive the luminaire light source 315 by regulating the power to the luminaire light source 315 by providing a constant quantity or power to the luminaire light source 315 as their electrical properties change with temperature, for example. The luminaire driver circuit 310 provides power to the luminaire light source(s) 315. The luminaire driver circuit 310 may include a ballast and an igniter for an arc gaslamp type of luminaire light source 315. Alternatively or additionally, the luminaire driver circuit 310 can include a constant-voltage driver, constant-current driver, or AC LED driver type circuit that provides dimming through a pulse width modulation (PWM) circuit and may have many channels for separate control of different LEDs or LED arrays that comprise the luminaire light source 315. An example of a commercially available luminaire driver circuit 310 is manufactured by EldoLED®. In the case of luminaire 10A, the luminaire driver circuit 310 is coupled to the luminaire light source 315 to control light source operation of the luminaire light source(s) 315. In particular, the luminaire 10A can include a luminaire optical wireless communication interface to transmit data over a VLC communication band. A VLC communication band is a data communications network variant, which uses visible light between 400 and 800 THz (780-375 nm), and is a subset of optical wireless communications technologies. VLC can be done by having the luminaire 10A output oscillating visible light or illumination lighting (e.g., projection of a barcode) in combination with the luminaire light source(s) 315. A common method of VLC modulation or oscillation is to rapidly vary luminaire brightness too quickly for a human eye to detect.

Luminaire driver circuit 310 can further include an AC or DC current source or voltage source, a regulator, an amplifier (such as a linear amplifier or switching amplifier), a buck, boost, or buck/boost converter, or any other similar type of circuit or component. Luminaire driver circuit 310 may output a variable voltage or current to the luminaire light source(s) 315 that may include a DC offset, such that its average value is nonzero, and/or an AC voltage.

The luminaire 10A can include a luminaire communication interface system 355 like the reporting device communication interface system 255 of FIG. 2. This example luminaire is configured to communicate with the reporting device 20A, as the luminaire 10A does not utilize the power source via the reporting device 20A and cannot transmit control signals 170A-N merely by current or voltage interruption to the reporting device driver circuit 310. Alternatively, if a luminaire 10C is not capable of connecting to the lighting control network 5, the circuitry of a luminaire 10C can be simple, potentially providing illumination lighting from the light source 315 when the power supply 205 received power. In such an example that luminaire 10C is recorded by a reporting device 20C connected to the lighting control network 5.

The luminaire 10A can also include some or all of the reporting device programming 236: if the luminaire 10A is trusted, the luminaire can generate its own performance metrics 240A based upon the performance of the light source 315, and even bundle its own records 242A, either of which the reporting device 20A then submits to the storage devices 40A-N.

FIG. 4A is a block diagram of a storage device 40A implemented as a database device 41 of the lighting control group that communicates via the lighting control network 5 of FIG. 1. The circuitry, hardware, and software of the database device 41 shown is similar to the reporting devices 20A-N of FIG. 2. The hardware of a database device 41 can be largely conventional. The database device 41 is configured to receive claim messages 170A containing records 242A-N of performance metrics 240A-N. A database device 41, possibly in conjunction with other storage devices 40B-N implemented as database devices 41, is configured to cryptographically confirm the validity of the records 242A-N transmitted by the reporting devices 20A-N. The validator 40A is configured to next add the valid records 242A-F to a block 450A or database record, and add that block 450A to the database 494.

A database device 41 can be within the physical space 2, or the database device 41 can be off-premises. So long as the database device 41 can receive claims messages 170A from the reporting devices 20A-N, the database device 41 is sufficiently connected to the lighting control network 5.

FIG. 4B is a block diagram of a storage device 40A implemented as a validator device 42 of the lighting control group that communicates via the lighting control network 5 of FIG. 1. The circuitry, hardware, and software of the validator device 42 shown is similar to the database device 41 of FIG. 4A. The hardware of a validator device 42 can be largely conventional. A validator device 42 is configured to receive claim messages 170A containing records 242A-N of performance metrics 240A-N. A validator device 42, in conjunction with other storage devices implemented as validator devices 42, is configured to cryptographically confirm the validity of the records 242A-N transmitted by the reporting devices 20A-N. The validator device 42 is configured to next add the valid records 242A-F to a block 450A. This block 450A is then shared between other storage devices 40B-N implemented as validators 42 via a block message 170C. The storage devices 40A-N implemented as validators 42 then verify that the blocks 450A received via block messages 170C are valid, and once a certain number of storage devices implemented as validators 42 agree regarding a certain block 450A then consensus is reached, and the storage devices 40A-N implemented as validators 42 add that block 450A to the blockchain 444.

A validator device 42 can be within the physical space 2, or a validator device 42 can be off-premises. So long as the validator device 42 can communicate with other validator devices 42 to effectively form consensus, and so long as the validator device 42 can receive claims messages 170A from the reporting devices 20A-N, the validator device 42 is sufficiently connected to the lighting control network 5.

Therefore, FIGS. 1-4 depict a lighting system 1, including a plurality of lighting system elements 3A-N located in a space 2, where the lighting system elements 3A-N include a plurality of luminaires 10A-N, a plurality of reporting devices 20A-N, and a plurality of storage devices A respective luminaire 10A includes a light source 315 to emit illumination lighting and a driver circuit 310 coupled to the luminaire 10A light source 315 to control light source operation of the luminaire light source 315. A respective reporting device 20A includes a reporting device network communication interface system 255 comprising at least one transceiver 246A-B configured for communication via a lighting control network 5 over a lighting control network communication channel for lighting control and systems operations. The respective reporting device 20A further includes a reporting device processor 230 coupled to the reporting device network communication interface system 255. The respective reporting device 20A further includes a reporting device memory 235 accessible to the reporting device processor 230. The respective reporting device 20A further includes reporting device programming 236 in the reporting device memory 235, wherein execution of the reporting device programming 236 by the reporting device processor 230 configures the reporting device 20A to implement functions. First, the reporting device 20A collects a respective performance metric 240A of the respective luminaire 10A. Second, the reporting device 20A submits a respective record 242A including the respective performance metric 240A from the respective luminaire 10A to some or all of the storage devices 40A-N.

Additionally, the lighting system 1 further includes a plurality of performance metrics 240A-Z, including the respective performance metric 240A. The plurality of performance metrics 240A-Z bundle one or more dynamic metrics 240B, one or more fixed attributes 240A, or a combination thereof. A dynamic metric 240B is generally a recorded performance value of a luminaire 10A, whereas a fixed attribute 240A is a set value, configured either at production, installation, or by a user of the luminaire 10A.

Fixed attributes 240A can include the following settings. A daylight harvesting setting of the respective luminaire 10A, which determines whether or how much daylight a detector 260 or sensor device 31 must detect before a driver circuit 310 turns the light source 315 off. The daylight harvesting setting can be set to inhibit production of illumination lighting when any daylight is detected by detectors 260 or sensor device(s) 31, to completely ignore any daylight detectors 260 and sensor device(s) 31, and to inhibit production of illumination lighting when a specific amount of daylight is detected by the detectors 260.

An occupancy sensing setting of the respective luminaire 10A, which determines whether or how many occupants a detector 260 or sensor device 31 must detect before a driver circuit 310 turns the light source 315 on. The occupancy sensing setting can be set to induce production of illumination lighting when any occupant is sensed by detectors 260 or sensor device(s) 31, to inhibit production of illumination lighting when no occupant is sensed by detectors 260 or sensor device(s) 31, or to completely ignore any occupants sensed by detectors 260 and sensor device(s) 31.

Fixed attributes 240A can include the following properties. A wattage-controlled property of the respective luminaire 10A, which determines the maximum amount of wattage the luminaire 10A is able to control. This setting can limit the power supply 205, preventing more than, for example ninety watts from being available to the luminaire 10A, even if more wattage is available from a line power source 201 or a non-line power source 202. Alternatively, this setting can limit the driver circuit 310, preventing more than, for example, eighty watts from being available to the light source 315 of the luminaire 10A, or to the luminaire 10C if that luminaire 10C is coupled to a driver circuit 310 of a reporting device 20A-N.

A square footage of light coverage property of the respective luminaire 10A, which determines the square footage services by a given luminaire 10A. Generally, a luminaire 10A which services a higher square footage area is more efficient than a luminaire 10B which services a small square footage area. This setting will often be set at installation, as a skilled technician is often proficient at determining how much area is serviced by a given luminaire and for determining how to handle two or more luminaires 10D-Z with overlapping lit square footage.

A lumens per watt property of the respective luminaire 10A, which determines the range of brightness available to a given luminaires 10A. Many light source(s) 315 have a preferred efficiency range (ignoring the light source 315 being off, which has zero lumens per zero watts, resulting in undefined efficiency) within which the optimal amount of lumens per watt can be achieved. For example, a light source 315 with a perfect range of efficiency can produce ten lumens per one watt: increasing the wattage linearly will increase the lumens linearly on the same slope. However, most light source(s) 315 are designed to target an ideal wattage, in an example eighty watts. Increasing the wattage by twenty percent will not result in a proportionate increase in lumens—the lumens will increase by a lower percentage. Furthermore, some light source(s) 315 cannot produce light at certain low wattages, for example ten watts or less: running such a light source 315 at 9.9 watts would be infinitely inefficient, as zero lumens are being produced per watt. Doing so may also still induce wear-and-tear on the light source 315, reducing lifespan. Additionally, extremely high wattages, such as five thousand watts, can destroy the light source 315, again resulting in zero lumens per watt, and obviously reducing the remaining lifespan of the light source 315 to zero. Therefore, limiting the acceptable range of lumens to watts, primarily by limiting the acceptable watt values, can improve light source 315 efficiency.

A light color temperature property of the light source 315 of the respective luminaire which determines the light color temperature of a given luminaire 10A. Different light color temperatures can have different perceptual brightness and energy efficiency, and so it may be valuable to limit the light temperatures available to the end user. Similarly, a color rendering index (CRI) property of the light source 315 of the respective luminaire 10A can also improve efficiency by limiting the color of the light source 315 to colors with high perceptual brightness and energy efficiency.

Fixed attributes 240A are not limited to the above, and may encompass any fixed or discrete value, configurable by either user or owner, and may encompass settings, properties, and measurements.

Dynamic metrics 240B can include the following records. A daylight harvesting inhibition over a period of time of the light source 315 of the respective luminaire 10A, which records how often the light source 315 is inhibited from producing illumination light based upon daylight sensed by the detectors 260 or sensor device(s) 31. This record works in tandem with the daylight harvesting setting: the more liberal the daylight harvesting setting, the more often the light source 315 will be inhibited when some amount of daylight is sensed by the detectors 260 or sensor device(s) 31. Knowing why the light source 315 does not produce illumination lighting can be relevant to the owner of the luminaire 10A: sunlight is usually free, but varies with time of day and seasonality: prediction of future energy usage can be improved by knowing the reason illumination lighting was inhibited. The owner of the luminaire 10A may want to reward the users of the luminaire 10A for utilizing sunlight rather than illumination lighting, but may not want to reward, or want to reward to a lesser extent, merely setting the luminaire 10A to a daylight harvesting mode: if the luminaire 10A is installed in a basement or subfloor, a user setting the luminaire 10A to harvest daylight is likely aware that daylight will never be harvested in a physical space 2 with no source of natural light: an owner might determine such a user should neither be rewarded nor punished for setting a luminaire 10A to pointlessly attempt to harvest sunlight.

An occupancy sensor inhibition over the period of time of the light source 315 of the respective luminaire 10A, which records how often the light source 315 is activated to produce illumination light based upon the presence of occupants. This record works in tandem with the occupancy sensing setting. Much like the daylight harvesting inhibition over a period of time of the light source 315, owners of the luminaire 10A may want to know if the light source 315 is activated due to sensed occupancy, and may want to reward users which have set the occupancy sensing setting judiciously, resulting in higher efficiency than either having the light source 315 provide illumination lighting constantly, or manually turning the light source 315 on and off as occupants enter and leave the physical space 2.

A user override percentage over the period of time of the respective luminaire 10A, which records how often a user overrides efficiency settings of the luminaire 10A. This record can track when individual settings are overridden, such as if a user turns on the light source 315 during a time period when the physical space is scheduled to be closed to occupants, or when a user sets the luminaire 10A to produce illumination lighting regardless of the presence of occupants in the physical space 2. The record can also track overall override time, independent of what rule or setting is being overridden; or, the record can convert the override results into a measurable quantity, such as the increase in wattage due to overrides during the period of time, or the duplicative or excess lumens requested due to overrides during the period of time. The record can also track overrides of illumination light temperature, brightness, and color.

An online percentage over a period of time of the respective luminaire 10A, which records how often the light source 315 of the luminaire 10A is activated and producing illumination light. This record can also track the percentage of time the luminaire 10A is connected to the lighting control network 5, or the percentage of time the luminaire 10C is connected to a reporting device 20A-N. An owner may want to presume that, if a luminaire 10A is not connected to the lighting control network 5, and the efficiency of the luminaire 10A cannot be monitored, then the luminaire 10A is being operated in an inefficient manner.

A high-output percentage over a period of time of the light source 315 of the respective luminaire 10A, which records how often the light source 315 is set to produce high-output illumination lighting. In some circumstances, light source(s) 315 can be configured to be able to produce-high output illumination: some examples include emergency egress lighting, disinfection lighting, or user-requested high-output lighting. High-output lighting is often less energy efficient than typical-output lighting, and so owners of the luminaire 10A may want to know how often high-output lighting is used, or may want to discourage the frivolous use of high-output lighting.

Dynamic metrics 240B are not limited to the above, and may encompass any variable or continuous value or range of values, configurable by either user or owner, and may encompass settings and measurements.

Furthermore, in some examples the submitted respective record 242A is encrypted using a shared public key 254 by the reporting devices 20A-N before transmitting to the validator devices 42. The storage devices 40A-N have access to this same public key 254 to assist in decryption of the encrypted respective record 242A. The shared public key 254 can be implemented with a secure firmware image placed on the reporting devices 20A-N or luminaires which report their own performance metrics 240A-N. Secure firmware images, coupled with trusted manufacturers, can improve trust and security, allowing the owner of the lighting control network 5 to trust the reported performance metrics 240A-N and potentially reward the users of the luminaires 10A-N for proper performance. Encryption may also involve private keys 256, and additionally or alternatively to a public key 254, a shared key 262.

The keys 254, 256, 262 may be an identifier, and the storage device 40A-N may maintain a whitelist or blacklist of reporting devices 20A-N or luminaires 10A-N with keys 254, 256, 262 permitted to submit performance metrics 240A-N for validation and storage. Devices may be added or removed from a trusted devices list as needed. A certification process and audits may be involved. Individual devices, sets of devices, whole sites, entire device models, or manufacturers of devices can be whitelisted or blacklisted. Claims history from reporting devices 20A-N or luminaires 10A-N can be inspected for suspicious behavior—Records 242A-N and performance metrics 240A-N need not be anonymous.

In some examples, the reporting device 20B is integrated as part of the luminaire 10B. In other examples, the reporting devices 20B is integrated as part of a storage device 40B. Although shown as standalone devices, the reporting device 20B and storage device 40B can be integrated with any of the lighting system elements 3A-N. Particularly, the luminaire 10B, reporting device 20B, and storage device 40B can all be integrated in some examples. In FIG. 1, this integration is represented with the reporting device 20B within the luminaire 10B. Any of combination of integrations among luminaires 10A-N, reporting devices 20A-N, and storage devices 40A-N are acceptable, and the distinction can be largely arbitrary: in some examples a single device is capable of performing the functionality of the reporting device 20B as well as the functionality of the luminaire 10B and the storage device 40B, in particular if the storage device is a validator device 42. When integrated, the reporting device 20B, luminaire 10B, and storage device 40B may share some components, such as a processor 230, 330, 430, 480 or a network communication interface system 255, 355, 455, 495. Alternatively, these components may remain segregated, such that a reporting device 20B integrated as part of the luminaire 10B may include a separate physical reporting device processor 230 and luminaire processor 330, or a separate reporting device memory 235 and luminaire memory 335, for example. Luminaires with integrated smart devices such as the reporting device programming 236 which allow for the creation of performance metrics 240A-N should be assigned to lighting control devices such as reporting devices 20A-N in the factory to ensure the validity of those performance metrics 240A-N.

Further, in certain examples the respective performance metric 240A of the respective luminaire 10A is certified by an operator of the lighting control network 5. This operator can be the owner of the network, and the certification is often performed by a reporting device 20A-N. At issue in conventional solutions which interact with physical, non-purely-mathematical worlds like the lighting system 1, is that while the records 242A-N submitted to a blockchain 444 or database 494 can have the veracity of those records 242A-N verified, the contents of the record 242A-N cannot be verified to the same extent. Meaning, the lighting control network 5 can cryptographically verify via the storage devices 40A-N that a valid reporting device 20A-N submitted a record 242A in a valid format—a rogue device connected to the lighting control network 5 has not submitted a false record 242A-N to the validators 40A-N. However, cryptographic verification is not applied to the contents of a record 242A related to actions or phenomena within the physical world: a record 242B can be verified to have been transmitted by a valid reporting device 20B, but if that claim states that luminaire 10B utilized 2.5 kilowatt hours in a month as a performance metric 240B, that fact cannot be cryptographically verified by the validator devices 20A-N: if the reporting device 20B has been physically tampered with, such that the reporting device 20B cannot properly detect wattage used by the luminaire 10A, then conventionally that tampering cannot be discerned in a cryptographic manner.

One solution to this problem is for the hardware of the reporting devices 20A-N to be designed in a tamper-proof, tamper-resistant, or tamper-evident manner: if tampering has occurred, then the lighting control network 5 is notified of that tampering by some behavior or non-behavior of the tampered reporting device 20B. Similarly, if an incidental error has occurred, for example that the sensor 260 which records wattage used by the luminaire 10B has become damaged and constantly reports zero watts used, the damage to the sensor can be noted by the lighting control network 5. The reporting devices 20A-N, validator devices 42, and the luminaires 10A-N can be manufactured by trusted manufacturers, which have an economic incentive to prevent fraud and tampering: if the devices 20A-N, 40A-N or luminaires 10A-N are audited and produce invalid performance metrics 240A-N, then the manufacturer may lose their trusted status, and their contract or permission to produce devices 20A-N, 40A-N or luminaires 10A-N. Therefore, approved manufacturers have a vested interest in ensuring their devices 20A-N, 40A-N and luminaires 10A-N are considered valid sources of records 242A. The reporting devices 20A-N, validator devices 42, and the luminaires 10A-N can also have secure firmware images installed, with the image security key held by the owner of the lighting control network even trusted manufacturers in such an example are less likely to be able to tamper with or adjust the firmware, and thereby the reporting device programming 236, database device programming 486, or validator device programming 436 installed on the device 20A-N or luminaries 10A-N.

Once the reporting device 20B is reasonably assured to not fail or be tampered with, or the reporting devices 20B fails and reports tampering in a predictable manner, the reporting device 20B can be certified, and the performance metrics 240A-Z reported within records 242A-N sent by the reporting device 20B are presumed to be reliable—so long as the reporting device 20B indicates no tampering or failure. In these examples, execution of the reporting device programming 236 by the reporting device processor 230 configures the reporting device to enable the operator of the lighting control network 5 to certify the respective performance metric 240A of the respective luminaire 10A.

An alternative implementation to certifying reporting devices 20B is a physical installation where reporting devices 20A-N audit and report on each other. For example, a group of reporting devices 20A-F may each be wired to each luminaire 10A-F: to falsify performance metrics 240A-Z in such a setting would require effecting tampering with all six reporting devices if the performance metrics 240A-Z recorded by the reporting devices 20A-F for a given luminaire 10A did not agree or substantially agree, then tampering or hardware failure is evident. Alternatively or additionally, a standalone reporting device 20G can be installed to audit all of the luminaires 10A-F collectively. Meaning, if reporting devices 20A-F each report 80.0 watts used by each luminaire 10A-F, but the standalone reporting device 20G reports 240.0 watts used collectively by the luminaires 10A-F, then the deviation between the summed individual usage (6×80.0=480.0 watts) and the collective usage (240.0 watts) indicates a failure or tampering of either the six reporting devices 20A-F or the standalone reporting device 20G. The standalone reporting device 20G may be installed remotely from the other reporting devices 20A-F, for example in a locked room. The standalone reporting device 20G could also be installed by the owner without the knowledge of the users, in order to more effectively detect attempted tampering of the reporting devices 20A-F known to the users.

These same issues and solutions apply whether the reporting devices 20A-N directly record usage and physical phenomena using detectors 260 of the reporting devices 20A-N, or if the luminaires 10A-N report to the reporting devices 20A-N their usage and physical phenomena over the lighting control network 5 or another network protocol, or if the luminaires 10A-N implement some or all of the reporting device programming 236 and send performance metrics 240A-N to the reporting devices 20A-N directly—the link between the physical phenomena and the record of the physical phenomena should be secured and observed, to ensure that the cryptographically secured records in the database 494 or blockchain 444 are representative of the physical phenomena (such as illumination lighting) generated, used, or experienced by the luminaires 10A-N.

FIGS. 1-4 also depict a lighting system including a plurality of lighting system elements 3A-N located in a space 2, where the lighting system elements 3A-N include a plurality of luminaires 10A-N, a plurality of reporting devices 20A-N, and a plurality of storage devices A respective luminaire 10A includes a light source 315 to emit illumination lighting and a driver circuit 310 coupled to the luminaire 10A light source 315 to control light source operation of the luminaire light source 315. A respective reporting device 20A includes a reporting device network communication interface system 255 comprising at least one transceiver 246A-B configured for communication via a lighting control network 5 over a lighting control network communication channel for lighting control and systems operations. The respective luminaire 10A further includes a reporting device processor 230 coupled to the reporting device network communication interface system 255. The respective luminaire 10A further includes a reporting device memory 235 accessible to the reporting device processor 230. The respective luminaire 10A further includes reporting device programming 236 in the reporting device memory 235, wherein execution of the reporting device programming 236 by the reporting device processor 230 configures the reporting device 20A to implement functions. First, the reporting device 20A collects a respective performance metric 240A of the respective luminaire 10A. Second, the reporting device 20A submits a respective record 242A including the respective performance metric 240A from the respective luminaire 10A to some or all of the storage devices 20A-N.

Additionally, a respective storage device 40A of the lighting system 1 comprises a validator device 42, which includes a validator device network communication interface system 455 including at least one transceiver 246A-B configured for communication via a lighting control network 5 over a lighting control network communication channel for lighting control and systems operations. The validator device 42 further includes a validator device processor 430 coupled to the validator device network communication interface system 455. The validator device 42 further includes validator device memory 435 accessible to the validator device processor 430. The validator device 42 further includes validator device programming 436 in the reporting device memory 435, wherein execution of the validator device programming 436 by the validator device processor 430 configures the validator device 42 to implement functions. First, the validator device 42 validates a plurality of records 242A-N, including the respective record 242A. Second, the validator device 42 achieves a consensus within a plurality of storage devices 40A-N comprising validator devices 42 for a subset 242A-F or all of the plurality of records 242A-N. Third, the validator device 42 stores the subset or all of the plurality of records 242A-F in a block 450A in at least one storage device 40A-N of the lighting control network 5, wherein the block 450A includes a lighting value token 452A.

Further, the function in the validator device programming 436 to achieve the consensus includes to decrypt the subset or all of the plurality of records 242A-F by a pre-determined number 464 of some or all of the storage devices 40A-N comprising a validator device 42. In many implementations of blockchain 444, the blockchain 444 itself is used in the encryption and decryption of these respective records 242A. However, in some blockchain implementations, only a certain number of recent blocks 450A in the blockchain 444 are used in encryption and decryption, and consequently devices like the validator device 42 may only maintain a partial blockchain 448 of recent blocks 450A in order to achieve consensus and add new blocks 450B to the blockchain 444 and partial blockchain 448. In some examples, the blockchain 444 or partial blockchain 448 is not used in the hashing process of encryption and decryption when validating records 242A-N. Some devices, where users can view the number and quality of their lighting value tokens 452A, may need to maintain the complete blockchain 444, while validator devices 42, which in these examples do not display the wallet addresses 456A-B or the lighting value tokens 452A associated with those wallet addresses, may only need to maintain a partial blockchain 448.

In some examples, the lighting system 1 further includes a respective luminaire benefactor wallet address 456A associated with an owner of the respective luminaire 10A, where the block 450A in the at least one lighting system element, in this example storage device 40A, of the lighting control network 5 makes a controlling association between the respective appliance benefactor wallet address 456A and the lighting value token 452A. In examples where the owner of the lighting system 1 desires to reward luminaires 10A-N responsible for high-quality performance metrics 240A-Z, the owner can quantify that reward within the lighting value tokens 452A-F. However, the value of the reward can only be utilized by a user if that value can be converted into some kind of real-world value, outside of the lighting control network 5. Even if that real-world value simply manifests as the enjoyment or pleasure of a user in receiving a reward, whether that enjoyment be based upon the recognition of their altruistic efforts, or their comparative superiority over their peers, that value should nevertheless be associated with that user in order to induce a material and personal emotional effect. Therefore, the value within a lighting value token 452A, representing the improved performance beyond a baseline of the luminaire 10A, must be somehow assigned, transferred, or associated with the user who brought about that improved efficient performance. By first provisioning that user with a wallet address, here the benefactor wallet address 456A, it enables the lighting control network to, when the lighting value token 452A is created, assign that lighting value token 452A to that benefactor wallet address 456A, and consequently assign that lighting value token 452A to the user for whom the benefactor wallet address 456A was provisioned, as a reward.

For the value within a lighting value token 452A-F to be remunerative, the reward should be transferrable, in order to be exchanged for goods or services. Therefore, in some examples the lighting system 1 further includes a buyer wallet address 456B associated with a buyer of lighting value token, where a transfer claim 458A is stored in a claim block 450B in the lighting control network 5, and the transfer claim 458A represents assigning the lighting value token 452A from the respective luminaire benefactor wallet address 456A to the buyer wallet address 456B. A transfer claim 458A is transactional in nature, and can be distinguished from a record 242A-F related to reporting of performance metrics 240A-Z. Transfer claims 458A, unlike records 242A-F can have their contents validated by the validator devices 42 of the lighting control network 5: the transfer of a lighting value token 452A from a benefactor wallet address 456A to a buyer wallet address 456B can be cryptographically verified. The protocol for verifying and deriving consensus for transfer claims 458A can be different than the protocol for verifying and deriving consensus for records 242A-F regarding recording performance metrics 240A-Z. Alternatively, the blockchain 444 may not represent or understand there to be any difference between records 242A-F regarding recording performance metrics 240A-Z and transfer claims 458A.

In examples where the value of a lighting value token 452A is remunerative in nature, that value can be represented as a quantity, or number. An example method for calculating that quantity is by creating ideal performance metrics 258A-Z. Ideal performance metrics 258A-Z includes ideal fixed attribute values and ideal dynamic metric values. Ideal performance metrics 258A-Z can be created network-wide, for example indicating that the ideal percentage that an occupancy sensor should be active is 100% of the time: any time period less than that arguably results in illumination lighting being generated in the physical space 2 that does not serve occupants, and is therefore wasteful. Alternatively, ideal performance metrics 258A-Z can be assigned at an individual luminaire 10A level: the luminaire 10A could be in an entryway, while the rest of the luminaires 10B-N reside further into a physical space 2: in such an example, that luminaire 10A may have an ideal performance metric 258A indicating that the percentage that an occupancy sensor should be active is 0%: the entryway in this example has been designated as always lit as a safety protocol, and the owner may not want to incentivize users to operate that luminaire 10A more efficiently at the expense of safety. In some examples, therefore, the lighting value token 452A includes a reward 466A, which may be burned or transferred. In further examples, that reward 466A may include or constitute a reward amount 462A. That reward amount 462A, being a quantitative value, which may be utilized for transactional purposes, is a rational number, and can in some examples be limited to positive rational numbers. The reward amount 462A can be calculated by the luminaire 10A, the reporting device 20A, or the storage device 40A; however, calculating the reward amount 462A at the storage device 40A may be more secure than calculating the reward amount 462A at the reporting device 20A, and calculating the reward amount at the reporting device may be more secure than calculating the reward amount at the luminaire 10A. The reward amount 462A may be calculated at any time, and the valuation process may change between the recording of a performance metric 240A at the luminaire 10A and the assignment of the reward amount 462A. Valuation of performance metrics 240A-N may depress or lower the weight of performance metrics 240A-N which are based upon user inputs, as opposed to performance metrics 240A-N which are based upon manufacturer inputs: A user may miscalculate how much square footage a particular luminaire services, whereas a manufacturer is less likely to improperly configure a wattmeter within a luminaire 10A or reporting device 20A which records wattage used by the light source 315 of the luminaire 10A. In the square footage example, appropriate square footage is the responsibility of the lighting designers, specifiers and installers. Overpacking of fixtures to leverage rewards can be considered gaming. Records 242A-N and luminaires 10A-N can be voided if insufficient square footage is covered and discovered based on audits or other means. A correlation to square footage known to be owned by the user can limit the square footage claimed in a performance metric 240A-N. To further avoid erroneous or fraudulent performance metrics 240A reported by users, a reporting device 20A can impose limits based on the maximum load ratings of the luminaire 10A, or the luminaire 10A can impose limits based on direct load measurement: these values are from the manufacturer, who again is less likely to erroneously or fraudulently assert these values. Rewards may be adjusted based on user entered power controlled versus directly measured.

The value of reward amount 462A can be calculated based on comparing the ideal performance metric 258A, either an ideal fixed attribute value or an ideal dynamic metric value, associated with a respective performance metric 240A. In particular, this can include taking the inverse absolute value of the difference between the ideal performance metric 258A and the performance metric 240, and additionally dividing by a basis to generate a percentage difference, or alternatively multiplying by a constant or variable value. For example, if the ideal performance metric 258A is 100% daylight harvesting, and the recorded performance metric 240A recorded 40% daylight harvesting, then the reward could be calculated as ((ideal performance metric—recorded performance metric)/(ideal performance metric))*constant factor, or ((1.0−0.4)/(1.0))*100, resulting in a reward amount 462A of 40.0. This calculation can be performed at the reporting device 20A-N, with the results placed within the claims message 170A, or the underlying performance metrics 240A-Z and ideal performance metrics 258A-N can be placed within the claims message 170A: in such an example, the validators 40A-N perform the reward amount 462A calculation in the process of verifying results and deriving consensus. However, the reward amount 462A may not require an ideal performance metric 258A-Z in order to calculate the reward amount 462A: the reward amount 462A may be calculated based solely upon the performance metric 240A.

The reward amount 462A, or a partial portion thereof, can be transaction and transferred from the recipient benefactor wallet address 456A to a buyer wallet address 456B. That buyer can exchange other goods and services in exchange for the transferred reward amount 462A, thereby imbuing the reward amount with economic value. The buyer can be the owner of the lighting control network 5 itself, or of the luminaires 10A, and in buying reward amounts 462A with fiat currency, can effectuate a rebate system, rewarding users and operators who use and operate the luminaires 10A-N within the ideal parameters and requirements of the owner. Alternatively, the owner, a regulator, or a government can institute a cap-and-trade system, wherein which fines are levied which can be paid in the reward amount 462A of light value tokens 452A. Users which choose to generate illumination lighting inefficiently or in low-performance manners can choose to purchase reward amounts 462A with fiat currency, instead of choosing to be efficient and highly-performant with their use of illumination lighting. The reward amounts 462A of the lighting value tokens 452A may take on economic value to other parties, and may be bought, held, exchanged, or sold by any number of parties, who may not and may have no plans to utilize or own luminaires 10A on the lighting system 1. The only requirement for ownership of the reward amount 462A of a lighting value token 452A is that the potential owner control a wallet address 456A-B on the blockchain 444. In some examples, wallet addresses can be spontaneously generated based upon a seed value, and therefore the wallet address does not need to be recorded on the blockchain 444 before that address can receive lighting value tokens 452A.

The previous example discloses a lighting value token 452A which contains a reward amount 462A. An equivalent example would include a lighting value token 452A which is an atomic unit of value: one which cannot be subdivided. The equivalent concept in physical American currency would be the penny. In such an example, the creation of a lighting value token 452A would not necessarily create a single token, but enough tokens to represent a rational number. For example, above the lighting value token 452A held a reward amount 462A of 40.0. If the smallest unit a lighting value token 452A could represent is 0.001, then the prior example of generating a single lighting value token 452A containing a reward amount 462A of 40.0, would instead generate 40,000 lighting value tokens 452, each with the atomic value of 0.001, resulting in a reward amount of 40.0. Both examples are functionally equivalent, interchangeable, and disclosed. The reward amount 462A as an abstract value can also be obviated by implementing a direct conversion of records 242A-N to currency via smart contracts which provide offers for claims, or offers of claims on a marketplace for a seller determined price.

FIG. 3 depicts a luminaire 10A including a light source 315 to emit lighting, a luminaire network communication interface system 355 for network communication, a luminaire processor 330 coupled to the luminaire network communication interface system 355, a driver circuit 310 coupled to the luminaire light source 315 to control light source operation of the luminaire light source, a luminaire memory 335 accessible to the luminaire processor 330, and performance tracking programming 236 in the luminaire memory 330. Execution of the performance tracking programming 236 by the luminaire processor causes the luminaire 10A to perform the following functions. First, the luminaire 10A measures a first running period of time 238A of the luminaire 10A of a plurality of running periods of time 238A-N. Second, the luminaire 10A forms a respective record 242A based on the first running period of time 238A. Third, the luminaire 10A submits the respective record 242A via the luminaire network communication interface system 355. The first running period of time 238A is distinct from each other running period of time 238B-N of the plurality of running periods of time 238A-N.

In some examples, measuring the first running period of time 238A further includes measuring one or more fixed attributes 240A of the luminaire 10A associated with the first running period of time 238A, one or more dynamic metrics 240B of the luminaire 10A associated with the first running period of time 238A, or a combination thereof. Forming the respective record 242A based on the first running period of time 238A can further include forming the respective record 242A with the measured one or more fixed attributes 240A, the one or more dynamic attributes 240B, or a combination thereof.

The fixed attributes 240A can include: an image firmware designation of a firmware image active in the luminaire memory 335, a physical attribute of the luminaire 10A, a default lighting control configuration of the luminaire 10A, or a combination thereof. The dynamic metrics 240B can include a physical state metric based on a physical state of the emitted lighting, a lighting control algorithm metric based on the state of a lighting control algorithm, a modification metric based on a modification to a default lighting control configuration, or a combination thereof.

In some examples, the fixed attributes 240A are factory-programmed, and include: a wattage-controlled property of the luminaire 10A, a lumens per watt property of the luminaire a light temperature property of the light source 315 of the luminaire 10A, a color rendering index (CRI) property of the light source 315 of the luminaire 10A, or a combination thereof. The dynamic metrics 240B may include one or more of the following: a high-output percentage over the first running period of time 238A of the light source 315 metric of the luminaire 10A, an occupancy metric based on occupancy detection, a daylight harvesting metric based on daylight harvesting, a user adjustment metric based on a manual user adjustment, a configuration change metric based on a scheduled configuration change, or a combination thereof. In other examples, the fixed attributes 240A are user programmed, and can include a square footage of light coverage attribute based on a square footage of light coverage of the luminaire 10A, a physical location attributed based on a physical location 2 where the luminaire 10A is installed, an installation date attribute based on an installation date of the luminaire 10A, a site information attribute based on site information of the physical location 2, a device operator attribute based on the device operator, or a combination thereof.

The submitted respective record 242A can be signed with a signature 260A using a private key 256 held within the luminaire memory 335. A public key 254 can be used to validate the signature of the private key 256, or a shared key 262 can be used to validate the signature 260A of the respective record 242A. The submitted respective record 242A can be signed with a signature 260A using a shared key 262 held within the luminaire memory 335.

FIG. 2 depicts a reporting device 20A, including a reporting device network communication interface system 255 for network communication, a reporting device processor 230 coupled to the reporting device network communication interface system 255, a reporting device memory 235 accessible to the reporting device processor 230, and performance tracking programming 236 in the reporting device memory 235. Execution of the performance tracking programming 236 by the reporting device processor 230 causes the reporting device 20A to implement the following functions. First, the reporting device 20A measures a first running period of time 238A of a respective electrical load (i.e. electrical load system element 703A of FIG. 7) of a plurality of running periods of time 238A-N and a fixed attribute 240A of the respective electrical load 703A, a dynamic metric 240B of the respective electrical load 703B, or a combination thereof. Second, the reporting device 20A forms a respective record 242A based on the first running period of time 238A of the electrical load 703A and the fixed attribute 240A, the dynamic metric 240B, or a combination thereof. Third, the reporting device 20A submits the respective record 242A via the reporting device network communication interface system 255. The first running period of time 238A is distinct from each other running period of time 238B-N of the plurality of running periods of time 238A-N. The reporting device 20A can further include a luminaire 10A, or an HVAC device 510A (see FIG. 5).

FIGS. 1-4 still further depict a lighting system 1, including a plurality of lighting system elements 3A-N located in a space 2, wherein the lighting system elements 3A-N include a luminaire 10A and a reporting device 20A. A respective luminaire 10A includes a light source 315 to emit illumination lighting and a driver circuit 310 coupled to the luminaire 10A light source 315 to control light source operation of the luminaire light source 315. A respective reporting device 20A includes a reporting device network communication interface system 255 for network communication. The respective reporting device 20A further includes a reporting device processor 230 coupled to the reporting device network communication interface system 255. The respective reporting device 20A further includes a reporting device memory 235 accessible to the reporting device processor 230. The respective reporting device 20A further includes performance tracking programming 236 in the reporting device 235 memory, wherein execution of the performance tracking programming 236 by the reporting device processor 230 causes the respective reporting device 20A to implement the following functions. First, the respective reporting device 20A measures a first running period of time 238A of the respective luminaire 10A of a plurality of running periods of time 238A-N and: a fixed attribute 240A of the respective luminaire 10A, a dynamic metric 240B of the respective luminaire 10A, or a combination thereof. Second, the respective reporting device 20A forms a respective record 242A based on the first running period of time 238A and: the fixed attribute 240A, the dynamic metric 240B, or a combination thereof. Third, the respective reporting device 20A submits the respective record 242A via the reporting device network communication interface system 255. The first running period of time 238A is distinct from each other running period of time 238B-N of the plurality of running periods of time 238A-N.

The lighting system elements 3A-N can further include a lighting control device 30; an occupancy, light level, motion sensor or audio sensor 31; or a combination thereof. Each record 242A-N from the respective reporting device 20A contains a unique identifier or signature 260A-N. The respective record 242A of the respective luminaire 10A can be certified by an owner of the lighting control network 5.

The lighting system 1 can further include at least one or more storage devices 40A-N. A respective storage device 40B of the one or more storage devices 40A-N includes a validator device 42, which includes a validator device network communication interface system 455 for network communication. The respective storage device 40B further includes a validator device processor 430 coupled to the validator device network communication interface system 455. The respective storage device 40B further includes a validator device memory 435 accessible to the validator device processor 430. The respective storage device 40B further includes validator device programming 436 in the validator device memory 435, wherein execution of the validator device programming 436 by the validator device processor 430 causes the respective validator device 42 to implement the following functions. First, the validator device 42 validates a plurality of records 242A-F, including the respective record 242A. Second, the validator device 42 stores the subset or all of the plurality of records 242A-F in a block 450A in at least one storage device 40B.

In some examples, the functions can include third, that the validator device 42 achieves a consensus within a plurality of storage devices 40A-N for a subset or all of the plurality of records 242A-F. Fourth, that the validator device 42 validates the signatures 264A-F of the subset or all of the plurality of records 242A-F by a pre-determined number 464 of the one or more storage devices 40A-N comprising a validator device 42 within a validation time window.

The lighting system 1 can include a benefactor wallet address 456A associated with a benefactor wallet that will receive a lighting reward 466A associated with the respective luminaire 10A. A block 450A in the at least one storage device 40A-N makes a controlling association between the benefactor wallet address 456A and the lighting reward 466A. A buyer wallet address 456B can be associated with a buyer wallet that will receive the lighting reward 466A from the benefactor wallet. A transfer record 458A is stored in a record block 450B in the at least one or more storage devices 40A-N. The transfer record 458A represents assigning the lighting reward 466A from the benefactor wallet address 456A to the buyer wallet address 456B, or burning the lighting reward 466A from the benefactor wallet address 456A and assigning the benefactor wallet address 456A a compatible digital currency as specified in the transfer record 458A. The lighting reward 466A can include a reward amount: The reward amount 462A is a rational number, and the value of the reward amount 462A is based on calculations which include the fixed attribute 240A or the dynamic metric 240B as inputs. In some examples, the fixed attribute 240A is associated with an ideal fixed attribute value 258A, the dynamic metric 240B is associated with an ideal dynamic metric value 258B, and the reward amount 462A is based on comparing the ideal fixed attribute 258A or the ideal dynamic metric value 258B with the respective fixed attribute 240A or the respective dynamic metric 240B.

FIG. 5 is a block diagram of a heating, venting, and air cooling (HVAC) system 501 including HVAC devices 510A-N of an HVAC control group that communicate via an HVAC control network 5 equivalent to the lighting control network 5 of FIG. 1. The circuitry, hardware, and software of the HVAC system 501 shown is similar to the lighting system of FIG. 1. However, as shown, HVAC devices 510A-N include an airflow component 615, for heating, ventilating, and cooling air proximate to the airflow component. The functionality of HVAC system 501 is the same as lighting system 1, except the HVAC system 501 is designed to primarily provide heating, venting, and air cooling, rather than lighting. Similarly, the interactions between, programming within, and configurations of the HVAC system elements 503A-N are the same as those of the lighting system elements 3A-N, excepting that the HVAC device 510A-N is designed to primarily provide heating, venting, and air cooling, rather than lighting like the luminaires 10A-N.

The HVAC system 501 may implement an HVAC value token 552A, or may implement a lighting value token 452A or an electrical load value token 752A (see FIG. 7) to allow or improve interoperability with a lighting system 1 or an electrical load system 701.

FIG. 6 is a block diagram of a heating, venting, and air cooling (HVAC) device 510A-N of the HVAC control group that communicate via an HVAC control network 5 equivalent to the lighting control network 5 of FIG. 1. The circuitry, hardware, and software of the HVAC device 510A-N shown is similar to the luminaires 10A-N of FIG. 3, and the HVAC devices 510A-N interface with similar reporting devices 20A-N to the reporting devices 20A-N as described in FIG. 2 in the same manner as the luminaires 10A-N. However, as shown, HVAC devices 510A-N include an airflow component 615, with a fan 616 and/or condenser 617 for heating, ventilating, and cooling air proximate to the airflow component. The functionality and programming of HVAC devices 510A-N are the same as luminaires 10A-N, except the HVAC devices 510A-N are designed to primarily provide heating, venting, and air cooling, rather than lighting. A reporting device 20A-N can track the performance metrics 240A-Z of the HVAC device 510A in a similar manner to tracking the performance metrics 240A-Z of the luminaire device 10A, and in some implementations the reporting device 20A may be agnostic or unaware whether the reporting device 20A is monitoring a luminaire 10A, an HVAC device 20A, or an appliance 710A.

Therefore, FIGS. 2, 4, 5, and 6 in combination depict a heating, venting, or air cooling (HVAC) system 501, including a plurality of HVAC system elements 503 located in a space 2, where the HVAC system elements 503A-N include a plurality of HVAC devices 510A-N and a plurality of reporting devices 20A-N. A respective HVAC device 510A includes an airflow component 615 to heat, vent, or cool air. a driver circuit 310 coupled to the HVAC airflow 615 component to control HVAC airflow operation of the HVAC airflow component 615. A respective reporting device includes 20A a reporting device network communication interface system 255 including at least one transceiver 246A-B configured for communication via a HVAC control network 5 over a HVAC control network communication channel for HVAC control and systems operations. A reporting device processor 230 coupled to the reporting device network communication interface system 255. A reporting device memory 235 accessible to the reporting device processor 230, and reporting device programming 236 in the reporting device memory 235, where execution of the reporting device programming 236 by the reporting device processor 230 configures the reporting device 20A to implement functions. First, the reporting device 20A collects a respective performance metric 240A of the respective HVAC system element 9. Second, the reporting device 20A submits a respective record 242A including the respective performance metric 240A from the respective HVAC device 510A to some or all of the reporting devices 20A-N.

FIG. 7 is an electrical load system 701 and electrical load control network 705 similar to that of FIG. 1. The electrical load system 701 functions in a similar manner to the lighting system 1, includes reporting devices 20D-I, and storage devices 40A-N like the lighting system 1, and implements the electrical load value tokenization protocol 800 like the lighting system 1.

The electrical control network 705 is physically separated into electrical load sub-networks 755A-B, connected by a WAN 55. The electrical load system elements 703A-N of the electrical load control network 705 do not need to be physically proximate, and can span across buildings, cities, countries, and continents if needed. The reporting devices 20A-N still communicate with the storage devices 40A-N to submit records 242A-N. The storage devices 40A-N in this example are validator devices 42, and so communicate to achieve consensus, but the storage devices 40B-N do not need to be in the vicinity 170A-B of the lighting control sub-network 755A-B to achieve consensus.

The lighting system elements 3A-N of the lighting control network 5, as well as the HVAC system elements 503A-N also do not need to be proximate, and can also span across buildings, cities, countries, and continents if needed. The electrical load control network 705 can also interoperate or include a lighting control network 5 or HVAC control network 505, and the distinction between the three control networks 5, 505, 705 can be largely arbitrary. Further, the electrical load control network 705 can include various types of electrical load system elements 703A-N, such as luminaires 10A-N, HVAC devices 510A-N, or appliances 710A-C— any electrical component that consumes or assembly that utilizes electricity to perform a function can be considered an electrical load system element(s) 703A-N.

In this example, one lighting control sub-network 755B does not have any storage device 40A-N within the vicinity 170B of that electrical load sub-network 755B. The luminaires and luminaires 10G-I can also be physically separated and illuminate different vicinities 170A-B. FIG. 7 also illustrates that the number of luminaires 10A-N do not need to be equal to the number of reporting devices 20A-N. Some reporting devices 10D-E can record on behalf of multiple luminaires 10D-F, and some reporting devices 10F-I can redundantly monitor some luminaires 10G-I; or, some reporting devices 20G-I can perform no monitoring or recording of luminaires 10G-I, and instead may be used to calculate consensus, perform and submit transactions, and report on the lighting control network 5. The number of storage devices 40A-N also does not need to be equal to the number of reporting devices 20A-N or luminaires 10A-N, HVAC devices 510A-N, or appliances 710A-C.

This example also depicts appliances 710A-C connected to the lighting control network 5. The appliances 710A-C can include kitchen fixtures such as a refrigerator 710A or an oven 710B. Though not depicted, the appliances 710A-C can include any kind of electrically-powered or electrical load-carrying device, such as a television, sump pump, garage door opener, sprinkler system, lathe, machining device, assembly line, elevator, MRI machine, lithium-ion battery, solar panel, generator, filtration device, or any other useful electrical tool or sub-system. Further, the appliance 710C can be tracked as an electrical socket: meaning, the reporting device 201 associated with the electrical socket appliance 710C has no information on the appliance plugged into the electrical socket appliance 710C: nevertheless, the reporting device 201 can still monitor dynamic metrics via the electrical socket appliance 710C, such as the wattage used. This can be combined with detector 260 data, such as sunlight or occupancy, to create performance metrics 240A-Z about the appliance plugged into the electrical socket appliance 710C without knowing anything about the appliance plugged into the electrical socket appliance 710C, other than the fact that it is plugged into the electrical socket appliance 710C.

When the lighting control network 5 or an HVAC control network 505 includes appliances 710A-C, it can be called an electrical load control network 705; likewise, when the lighting system 1 or an HVAC system 501 includes appliances 710A-C, it can be called an electrical load system 701: this distinction is largely arbitrary. The storage devices 40A-N may also generate electrical load value tokens 752A instead of lighting value tokens 452A or HVAC value tokens 552A.

It also should be understood that the lighting control network 5 and the HVAC control network 505 do not need to operate exclusively: a single electrical load control network 705 can implement both the elements of a lighting control network and an HVAC control network 505. In such an example, reporting devices can record performance metrics 240A-Z for any number of devices: lighting, HVAC, appliance, or other. The reporting devices 20A-N can be configured to know what kind of electrical load is being recorded, and have tailored performance metrics 240A-Z for particular types or categories of devices; or, the reporting devices 20A-N can be agnostic and unaware of the electrical load being monitored, and track basic metrics such as wattage utilization patterns, heat generation, and power usage when the space 2 is unoccupied.

Therefore, FIGS. 1-7 depict a reporting device 20A including a reporting device network communication interface system 255 with at least one transceiver 246A-B configured for communication via an electrical load control network 705 over an electrical load control network communication channel for electrical load control and systems operations. A reporting device processor 230 coupled to the reporting device network communication interface system 255. A reporting device memory 235 accessible to the reporting device processor 230. Reporting device programming 236 in the reporting device memory 235, wherein execution of the reporting device programming 236 by the reporting device processor 230 configures the reporting device 20A to implement functions. First, the reporting device 20A collects a respective performance metric 240A of a respective electrical load: an appliance 710A, luminaire 10A, or HVAC device 510A. Second, the reporting device 20A submits a respective record 242A including the respective performance metric 240A from the respective electrical load (appliance 710A, luminaire 10A, or HVAC device 510A) to some or all of a plurality of storage devices 40A-N.

In some examples, the reporting device 20A includes a luminaire 10A. In other examples, the reporting device 20A includes an HVAC device 510A. In further examples, the reporting device 20A includes an appliance 710A. The reporting device 20A can also include a plurality of performance metrics 240A-Z, including the respective performance metric 240A, where the plurality of performance metrics 240A-Z bundle one or more dynamic metrics, one or more fixed attributes, or a combination thereof. The fixed attributes can include a wattage-controlled property of the electrical load system 701 element. The dynamic metrics can include an online percentage over a period of time record of the reporting device, or a user override percentage over the period of time record of the reporting device.

Figure 8:
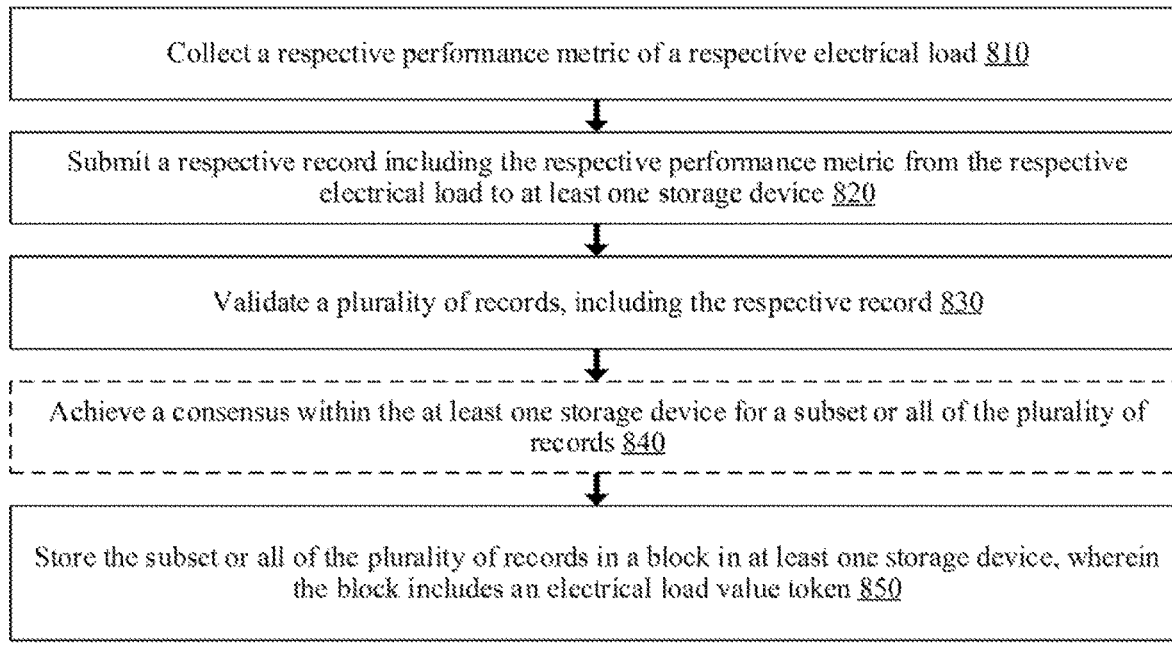
FIG. 8 depicts an electrical load value tokenization protocol for recording performance metrics for luminaires, HVAC devices, and other appliances coupled to a reporting device.

FIG. 8 depicts an electrical load value tokenization protocol 800 for recording performance metrics 240A-Z of luminaires 10A-N, HVAC devices 510A-N, or other appliances 710A-C. Beginning in block 810, a reporting device 20A collects respective performance metric 240A of a respective electrical load (e.g., an appliance 710A, luminaire 10A, or HVAC device 510A). The electrical load value tokenization protocol 800 can also be for HVAC devices 510A-N if generating HVAC value tokens 552A, or for luminaires 10A-N if generating lighting value tokens 452A.

In block 820, the reporting device 20A submits a respective record 242A including the respective performance metric 240A from the respective electrical load (e.g., the luminaire 10A, HVAC device 510A, or appliance 710A) to some or all of a plurality of storage devices 40A-N.

In block 830, the storage devices 40A-N or a subset of storage devices 40A-F validate a plurality of records 242A-N, including the respective claim 240A. If the storage devices 40A-N are validator devices 42, next in block 840, the validator devices 42 achieve a consensus within the plurality of the validator devices 42 for a subset or all of the plurality of records 242A-F. If the storage devices 40A-N are database devices 41, there may be no need to establish consensus, and block 840 may be skipped. Finally, in block 850 at least one storage device 40A-N stores the subset or all of the plurality of records 242A-F in a block 450A of the blockchain 444 of an electrical load control network 705, where the block 450A includes an electrical load value token 752A, such as a lighting value token 452A or an HVAC value token 552A.

Again, the lighting value token 452A can be particularized to performance metrics 240A-Z collected regarding a luminaire 10A, and an HVAC value token can be particularized to performance metrics 240A-Z collected regarding an HVAC device 510A. Alternatively, the distinction between a lighting value token 452A, HVAC value token 552A, and an electrical load value token 752A can be in name only, and the token types 452A, 552A, 752A can be generic and interchangeable in function. The electrical load value token 752A can include the lighting value token 452A or HVAC token 552A, and the category of tokens which meet the definition of as electrical load value token 752A on the blockchain 444 or in the database 494 can include the lighting value token 452A or HVAC token 552A on the blockchain 444 or in the database 494. Still further, tokens 452A, 552A, 752A can be particularized to the luminaire 10A, HVAC device 510A, or appliance 710A for which the token 452A, 552A, 752A stores performance metrics 240A-Z or reward amounts 452A. This particularization may be structural, such that light value tokens 452AA-N, HVAC value tokens 552A-N, and electrical load value tokens 752A-N cannot be stored on the same blockchain 444 or in the same database 494, or the particularization may only extend to the content of the token 452A, 552A, 752A, meaning that the tokens 452A-N, 552A-N, 752A-N can be stored on the same blockchain 444 or in the same database 494, or that the reward amounts 462A or performance metrics 240A-Z are denominated in an interchangeable fashion.

Any of the steps or functionality of the electrical load value tokenization protocol 800, described herein for reporting device 20A-N and validator device 42 of the lighting system 1 can be embodied in programming or one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++), procedural programming languages (e.g., C or assembly language), or firmware. In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A luminaire, comprising:
   a light source to emit lighting;
   a luminaire communication interface system configured to communicate with a validator device;
   a luminaire processor coupled to the luminaire communication interface system;
   a driver circuit coupled to the light source and configured to control operation of the light source;

a luminaire memory accessible to the luminaire processor; and performance tracking programming in the luminaire memory:

wherein:

the performance tracking programming when executed by the luminaire processor causes the luminaire to:

measure a first running period of time of the luminaire;

form a respective record based on the first running period of time;

sign the respective record with a signature using a key to produce a signed record; and cause the luminaire communication interface system to transmit a claim message containing the signed record to the validator device;

the claim message is configured to cause the validator device to:

validate the signature using at least one of a public key, a private key, or a shared key stored in a memory of the validator device; and validate the respective record at least in part by determining whether the first running period of time overlaps with one or more of a plurality of running periods of time in a history of validated records stored in the memory of the validator device.

2. The luminaire of claim 1, wherein:

the performance tracking programming when executed further causes the luminaire to measure operating parameters of the luminaire over the first period of time, the operating parameters comprising one or a combination of:

i) one or more fixed attributes of the luminaire associated with the first running period of time, or ii) one or more dynamic metrics of the luminaire associated with the first running period of time; and forming the respective record based on the first running period of time further includes forming the respective record with:

i) the measured one or more fixed attributes, ii) the one or more dynamic attributes, or iii) a combination thereof.

3. The luminaire of claim 2, wherein:

the fixed attributes include:

i) an image firmware designation of a firmware image active in the luminaire memory, ii) a physical attribute of the luminaire, iii) a default lighting control configuration of the luminaire, or iv) a combination thereof; and the dynamic metrics include:

i) a physical state metric based on a physical state of the emitted lighting, ii) a lighting control algorithm metric based on a state of a lighting control algorithm, iii) a modification metric based on a modification to a default lighting control configuration, or iv) a combination thereof.

4. The luminaire of claim 2, wherein the fixed attributes are factory-programmed, and include:

i) a wattage-controlled property of the luminaire, ii) a lumens per watt property of the luminaire, iii) a light temperature property of the light source of the luminaire, iv) a color rendering index (CRI) property of the light source of the luminaire, or v) a combination thereof.

5. The luminaire of claim 2, wherein the dynamic metrics include one or more of the following:

i) a high-output percentage over the first running period of time of a light source metric of the luminaire, ii) an occupancy metric based on occupancy detection, iii) a daylight harvesting metric based on daylight harvesting, iv) a user adjustment metric based on a manual user adjustment, v) a configuration change metric based on a scheduled configuration change, or vi) a combination thereof.

6. The luminaire of claim 2, wherein the fixed attributes are user programmed, and include:

i) a square footage of light coverage attribute based on a square footage of light coverage of the luminaire, ii) a physical location attribute based on a physical location where the luminaire is installed, iii) an installation date attribute based on an installation date of the luminaire, iv) a site information attribute based on site information of the physical location, v) a device operator attribute based on a device operator, or vi) a combination thereof.

7. The luminaire of claim 1, wherein the key is a luminaire private key held within the luminaire memory.

8. The luminaire of claim 1, wherein the key is a luminaire shared key held within the luminaire memory.

9. A reporting device, comprising:

a reporting device communication interface system configured to communicate with a validator device;

a reporting device processor coupled to the reporting device communication interface system;

a reporting device memory accessible to the reporting device processor; and performance tracking programming in the reporting device memory;

wherein:

the performance tracking programming when executed by the reporting device processor causes the reporting device to:

measure a first running period of time of a respective electrical load and:

i) a fixed attribute of the respective electrical load, ii) a dynamic metric of the respective electrical load, or iii) a combination thereof;

form a respective record based on the first running period of time of the electrical load and:

i) the fixed attribute, ii) the dynamic metric, or iii) the combination thereof; and sign the respective record with a signature using a key to produce a signed record;

cause the reporting device communication interface system to transmit a claim message containing the signed record to the validator device;

the claim message is configured to cause the validator device to:

validate the signature using at least one of a public key, a private key, or a shared key stored in a memory of the validator device; and validate the respective record at least in part by determining whether the first running period of time overlaps with one or more of a plurality of running periods of time in a history of validated records stored in the memory of the validator device.

10. The reporting device of claim 9, further comprising a luminaire.

11. The reporting device of claim 9, further comprising an HVAC device.

12. A lighting system, comprising:
a luminaire, a reporting device, and a validator device located in a space;
wherein:
the luminaire comprises:
a light source to emit illumination lighting; and
a driver circuit coupled to the light source and configured to control operation of the light source;
the reporting device includes:
a reporting device communication interface system configured to communicate with the validator device;
a reporting device processor coupled to the reporting device communication interface system;
a reporting device memory accessible to the reporting device processor; and
performance tracking programming in the reporting device memory;
the performance tracking programming when executed by the reporting device processor causes the reporting device to:
measure a first running period of time of the a luminaire and:
 i) a fixed attribute of the luminaire,
 ii) a dynamic metric of the luminaire, or
 iii) a combination thereof;
form a respective record based on the first running period of time and:
 i) the fixed attribute,
 ii) the dynamic metric, or
 iii) the combination thereof;
sign the respective record with a signature using a private key or a shared key held within the reporting device memory to produce a signed record; and
cause the reporting device communication interface system to transmit a claim message containing the signed record to the validator device;
the validator device comprises:
a validator device communication interface system configured to communicate with the reporting device;
a validator device processor coupled to the validator device communication interface system;
a validator device memory accessible to the validator device processor; and
validator device programming in the validator device memory;
the validator device programming when executed by the validator device processor causes the validator device to:
validate the signature using at least one of a public key, a private key, or a shared key stored in the validator device memory of the validator device; and
validate the respective record at least in part by determining whether the first running period of overlaps with one or more of a plurality of running periods of time in a history of validated records stored in the validator device memory of the validator device.

13. The lighting system of claim 12, further comprising:
i) a lighting control device;
ii) an occupancy, light level, motion, or audio sensor; or
iii) a combination thereof.

14. The lighting system of claim 12, wherein:
each record from the reporting device contains a unique identifiers;
a respective unique identifier of the respective record from the reporting device is used to certify the respective record; and
a certified record is presumed to be reliable by an operator of the lighting system.

15. The lighting system of claim 14, wherein the respective record of the luminaire is certified by an owner of the lighting control network.

16. The lighting system of claim 12, wherein validator device programming when executed by the validator device processor causes the validator device to:
achieve a consensus of one or more validator devices for a subset or all of a plurality of records by having a certain number of the one or more validator devices verify that the plurality of records is valid; and
validate signatures of the subset or all of the plurality of records by a pre-determined number of the one or more validator devices within a validation time window.

17. The lighting system of claim 12, further comprising:
a benefactor wallet address associated with a benefactor wallet in a storage device of the lighting system, the benefactor wallet configured to receive a lighting reward associated with the luminaire;
wherein:
a block in the storage device makes a controlling association between the benefactor wallet address and the lighting reward; and
the controlling association allows a benefactor owner of the benefactor wallet to utilize a value of the lighting reward.

18. The lighting system of claim 17, further comprising a buyer wallet address associated with a buyer wallet in the storage device, the buyer wallet configured to receive the lighting reward from the benefactor wallet, wherein:
a transfer record is stored in a record block in the storage devices; and
the transfer record represents:
 i) assigning the lighting reward from the benefactor wallet address to the buyer wallet address, or
 ii) burning the lighting reward from the benefactor wallet address and
assigning the benefactor wallet address a compatible digital currency as specified in the transfer record.

19. The lighting system of claim 17, wherein
the lighting reward includes a reward amount;
the reward amount is a rational number; and
the value of the reward amount is based on calculations which include the fixed attribute or the dynamic metric as inputs.

20. The lighting system of claim 19, wherein:
the fixed attribute is associated with an ideal fixed attribute value;
the dynamic metric is associated with an ideal dynamic metric value;
the reward amount is based on comparing the ideal fixed attribute or the ideal dynamic metric value with the fixed attribute or the dynamic metric.

21. The lighting system of claim 17, wherein:
the luminaire and an alternative luminaire of the lighting system are metered at a building level;
the benefactor wallet has a first one-to-many association with the luminaire;

an alternative wallet has a second one-to-many association with the alternative luminaire; and the benefactor wallet is separate from the alternative wallet.

22. The lighting system of claim 17, wherein:

the lighting reward is determined after the consensus is achieved;

the lighting reward is determined by the validator device; and the lighting reward is given to the benefactor wallet by the validator device.

23. The lighting system of claim 16, wherein:

the one or more validator devices are configured to, upon some of the subset or all of the one or more validator devices agreeing that an unvalidated block including a subset or all of the plurality of records is invalid, request that the reporting device, the luminaire, or a combination thereof, re-convene and determine whether the respective record should be validated by the one or more validator devices.

24. The lighting system of claim 13, wherein:

the occupancy, light level, motion, or audio sensor is segregated from the luminaire, and is configured to report a sensor fixed attribute, a sensor dynamic metric, or a combination thereof; and the reporting device uses the sensor fixed attribute, the sensor dynamic metric, or the combination thereof to measure the fixed attribute of the luminaire, the dynamic attribute of the luminaire, or the combination thereof.

25. The lighting system of claim 16, wherein consensus is achieved by:

the validator device adding a validated subset or all of the plurality of records to an unvalidated block;

the validator device sharing the unvalidated block with the one or more validator devices;

each of the one or more validator devices performing a verification of the unvalidated block; and some of the one or more validator devices agreeing that the unvalidated block is valid.

26. The luminaire of claim 1, wherein measuring the first running period of time of the luminaire utilizes a timer.

27. The luminaire of claim 1, wherein validating the respective record includes validating a sum of running periods of time of the luminaire does not exceed a time available in a window of time for those records, and the window of time is an operating time of the luminaire.

28. The luminaire of claim 1, wherein the key is implemented with a secure firmware image placed on the luminaire.

* * * * *